United States Patent [19]
Mian et al.

[11] Patent Number: 5,636,026
[45] Date of Patent: Jun. 3, 1997

[54] METHOD AND SYSTEM FOR CONTACTLESS MEASUREMENT OF RAILROAD WHEEL CHARACTERISTICS

[75] Inventors: Zahid F. Mian, Loudonville, N.Y.; Thomas Hubin, Laurel, Md.

[73] Assignee: International Electronic Machines Corporation, Albany, N.Y.

[21] Appl. No.: 405,228

[22] Filed: Mar. 16, 1995

[51] Int. Cl.⁶ .................................................. G09G 1/04
[52] U.S. Cl. ...................... 356/376; 356/385; 356/386; 356/387; 250/224; 250/559.19
[58] Field of Search ........................ 356/376, 384, 356/385, 386, 387; 250/560, 224

[56] References Cited

U.S. PATENT DOCUMENTS

| | | | |
|---|---|---|---|
| 4,040,738 | 8/1977 | Wagner | 356/1 |
| 4,125,317 | 11/1978 | Gordon et al. | 356/376 |
| 4,248,532 | 2/1981 | Nosler | 365/1 |
| 4,432,229 | 2/1984 | Nowogrodzki | 73/146 |
| 4,531,837 | 7/1985 | Panetti | 356/376 |
| 4,674,869 | 6/1987 | Pryor et al. | 356/1 |
| 4,678,920 | 7/1987 | Iadipaolo et al. | 250/560 |
| 4,679,447 | 7/1987 | Sieradzki et al. | 73/865.8 |
| 4,798,963 | 1/1989 | Wittkopp et al. | 250/560 |
| 4,798,964 | 1/1989 | Schmalfuss et al. | 250/560 |
| 4,904,939 | 2/1990 | Hoskins, Jr. | 33/203 |
| 4,936,529 | 6/1990 | Maine | 246/169 R |
| 5,278,633 | 1/1994 | Vowles | 356/376 |
| 5,402,238 | 3/1995 | Doy et al. | 356/376 |
| 5,477,371 | 12/1995 | Shafir | 356/376 |

FOREIGN PATENT DOCUMENTS

0007227A1  1/1980  European Pat. Off.

*Primary Examiner*—Frank Gonzalez
*Assistant Examiner*—Reginald A. Ratiff
*Attorney, Agent, or Firm*—Heslin & Rothenberg, P.C.

[57] ABSTRACT

All critical wheel wear measurements on a static or in-motion train wheel are taken using a non-contact method/system. The train wheel is measured using a modulated point beam of energy impinging the wheel surface from an orthogonal direction, moving the point beam across the wheel surface, and sensing the unique modulated reflection of the wheel using energy sensors that produce analog signals. The analog signals are digitized and processed to produce all critical wheel wear measurements without removing the wheel from the train.

50 Claims, 14 Drawing Sheets

METHOD AND SYSTEM FOR CONTACTLESS MEASUREMENT OF RAILROAD WHEEL CHARACTERISTICS

FIELD OF THE INVENTION

This invention principally relates to train wheel wear measurement systems and methods, and more particularly, to a wheel wear measurement system which is railroad track mounted and capable of providing all critical wheel wear measurement readings automatically without operator intervention.

BACKGROUND ART

A train wheel is subject to normal wear due to friction contact between the wheel and the rail. As a train wheel wears out, the rim thickness and flange thickness decrease and the flange height increases. Thus, there is a need to accurately measure the rim thickness, flange thickness, flange height, wheel reference groove, wheel diameter, flange throat profile (i.e., a collection of two or more measurement point data acquired in the area of interest), and wheel "Gage" in order to ensure that wheels in operation are safe. These safety check measurements typically take place in train yards and in train shops. Before the train can leave the yard, all the wheels are visually inspected and a wheel with noticeable wear is measured to verify that the wheel is in good condition. Also, train wheels are inspected on a routine basis to verify that the wheels are in good condition.

Similar measurements are used in recutting (wheel truing) the wheels to restore wheel profile as wheel wear exceeds certain permissible tolerances of flange height and flange thickness. This wheel truing operation takes place in train shops. Locomotives, freight and transit cars are typically rolled into the shop for possible wheel repair work. Also, similar measurements are used by wheel manufacturers for production quality control of train wheels as the wheels roll off a production line.

Historically, these measurements have been manually taken using mechanical calipers. One such widely used mechanical wheel gauge looks like an inverted "J". In use, the readings are read and recorded by the operator directly off the mechanical gauge while the gauge is positioned against a wheel. There are several drawbacks, however, to such a mechanical gauge for the above-mentioned applications. In a situation where the wheel is installed on a train, for example, there are three major problems. First, the train wheel has quite a few mechanical parts such as brakes, shock absorbers and axle support mechanisms around it. Measurements have accordingly been difficult to take with the mechanical gauge because of the limited space around the wheel and because of the location of the flange on a train wheel (towards the inside of a track). Secondly, environmental conditions where the measurements are made are often poor. For example, dim light often makes this task extremely difficult to perform. Thirdly, measuring a number of wheels can be laborious.

Further, operator dependent manual recording errors of measurement(s), and keypunch errors, make this important wheel wear monitoring process on installed wheels very undependable. Measurement error can lead to three problems for the railroad. First, unacceptable wheels can remain in service providing an uncomfortable ride and posing a significant safety and liability hazard; second, wheels can be condemned which should be trued or reprofiled; and third, wheels which should be condemned are sometimes sent for trueing, resulting in a disruption of the work flow in the wheel trueing shop.

The mechanical gauge has been in use since 1923. Nevertheless, every year a number of train accidents are attributed to excessively worn-out wheels. Train maintenance staff measurement errors contribute to this safety risk. Several companies have invested heavily in computerized wheel management systems which are designed to automate the wheel maintenance process. However, the current mechanical gauge does not provide accurate measurements to feed to such computerized wheel management systems. Furthermore, the wheel maintenance staff cannot restore a wheel to a prescribed profile when accurate wheel wear measurements are unavailable.

Several attempts have been made to automate the wheel wear measurement process. These attempts include handheld gaging systems and track mounted gaging systems. Among the handheld gaging systems, one arrangement is featured in U.K. Patent Application No. GB 2183840A (granted Jun. 10, 1987, Martti Kurkinan, inventor). This arrangement measures only rim profile using an electromechanical contact probe which travels across the rim. Measured profile is compared with a good reference profile gathered using a second probe. Another attempt is featured in U.S. Pat. No. 4,904,939 (granted Feb. 27, 1990, Zahid Mian, inventor). This approach addresses the typical problems with handheld railway wheel profile measurement arrangements such as non-portability, inability to gather vital measurements, and significant mechanical wear of the instrument. However, two difficulties remain. One is that the wheel measurement process remains laborious when many wheels have to be measured quickly. Second is that accessing mounted wheels is still not always easy due to the presence of other mechanical parts such as brake shoes surrounding a mounted wheel.

Several other efforts have been made in the area of track mounted wheel measurement systems, for example, reference U.S. Pat. No. 3,820,016 (granted Jun. 25, 1974, Marion Giesking, inventor) and U.S. Pat. No. 4,407,072 (granted Oct. 4, 1983, Hoskins, inventor). Both of these arrangements utilize complicated electromechanical parts which come in contact with the wheel. Therefore, these arrangements necessarily lack accuracy, result in wear of measurement mechanisms over time, and are difficult to maintain.

Another arrangement is mentioned in European patent No. EP 0007227A1 (W. H. Steel, et al., inventors). This arrangement suggests using a high intensity light source and a TV camera to gather information about rail-head image primarily. The approach has several deficiencies, however; namely: it is vulnerable to ambient light conditions producing erroneous measurements; it requires time consuming image processing for each image acquired; it does not correct for image distortion due to relative movement between the arrangement and the camera; and it does not provide the necessary wheel dimensions such as flange thickness.

Still another arrangement is described in U.S. Pat. No. 4,798,963 (granted Jan. 17, 1989, Wittkopp, inventor). This arrangement provides only a wheel diameter measurement using multiple light sources. Unfortunately, the method is susceptible to ambient light conditions, and does not correct for measurement errors due to sideways movement of the wheel. A similar arrangement is described in U.S. Pat. No. 4,798,964 (granted Jan. 17, 1989, Schmalfuss, inventor). Based on optical measurement schemes, this arrangement uses multiple broad band light sources, a mechanical platform subject to wear, and complex optical means to measure wheel diameter and tread surface. Unfortunately, this system is difficult to keep clean of dirt in the railway environment, provides questionable measurement accuracy, operates at very low speeds due to a complicated mechanical arrangement, does not provide wheel dimensions in absolute units, is expensive to produce due to complex optical measuring schemes, requires significant installation space, and is not suitable for outdoor operation. Similar to other camera-imaging based systems, the system relies on acquiring a complete image of the wheel, requiring slow and expensive image processing hardware that does not provide direct wheel measurements.

Therefore, there presently exists a genuine need for a track mounted electronic train wheel non-contact gaging system capable of improving the integrity of the wheel wear measurement process by quickly gaging key dimensions of the wheel irrespective of lateral and horizontal wheel movement. Such a system will provide accurate and quick wheel wear measurements in absolute units automatically, and directly thus reducing the opportunities for operator errors. Featuring high speed response, easy maintenance, minimal wear over time, minimal in field maintenance, low cost, and the capabilities of directly feeding the maintenance computer with wheel wear information, such a system will find use in a railway repair shop, railway yard, main railway service track, and railway wheel production facilities.

SUMMARY OF THE INVENTION

Accordingly, a principal object of the present invention is to provide a track mounted wheel wear measurement system capable of providing the seven critical wheel wear measurements electronically, automatically, rapidly and accurately.

Another object of the invention is to increase train safety, comfort and efficiency.

Another object is to provide a wheel wear gauge which can be used to efficiently and accurately measure rim thickness, flange height, flange thickness, flange throat profile, reference groove, wheel diameter, and wheel "Gage" of installed train wheels, in situ; is easy to use, durable, flexible and reliable; and can be readily and cost effectively manufactured.

Another object of the present invention is to provide a gaging system capable of taking all seven readings in a single application of the gaging system to the train wheel so as to reduce measurement time.

Another object of the present invention is to take accurate readings without contacting the wheel while the wheel is stationary or in motion and to take the wheel measurement whether the wheel is attached or unattached to a locomotive or railroad car.

Another object of the present invention is to provide means to take accurate wheel readings without regard to ambient light conditions or wheel surface quality, that performs equally well in indoor or outdoor lighting conditions and on new wheels as well as worn wheels.

Another object of the present invention is to provide a wheel gaging system which will continue to operate in all weather conditions, including snow and sleet.

Another object of the present invention is to provide a gaging system which permits consistently accurate measurements; minimizes operator introduced measurement, recording, transcription and calculation errors; and accounts for improper positioning of a wheel over the gaging system before measurements are taken.

Still another object of the invention is to provide an electronic wheel wear measuring system which is very rugged, employs few moving parts, and can provide accurate measurements in a harsh environment year after year with little in field maintenance and calibration requirements.

Yet another object of the present invention is to provide a gaging system which can automatically store the measurement data, retain the data for an extended period of time, and then directly transfer the data to another computer or a printer.

It is a further object of the present invention to make the wheel wear gaging system inexpensive so that it can be affordably manufactured.

It is a further object of the present invention to make the wheel wear gaging system compact for easy installation and service.

A further feature of the present invention is its ability to also take wheel diameter measurements and to automatically provide left and right wheel diameter comparisons. Left and right wheels on the same axle have to be sized within a small tolerance of each other to insure passenger safety and proper drive train operation.

Briefly described, the present invention accomplishes these objects by providing in a first aspect a method for measuring in a contactless manner a characteristic of a wheel. The method includes the steps of: projecting a point beam of energy at a surface location on the wheel, the point beam of energy impinging the surface location from a substantially orthogonal direction; sensing a reflection of the point beam of energy from the wheel and producing therefrom an electrical analog signal representing the characteristic of the wheel; digitizing the electrical analog signal to directly produce a digit output signal representing the characteristic of the wheel; and automatically repositioning the point beam of energy projected at the wheel and repeating the sensing and digitizing steps for at least one other surface location on the wheel.

In another aspect, the invention comprises a method for simultaneously measuring in a contactless manner multiple characteristics of a wheel. This method includes the steps of simultaneously, for each characteristic of the multiple characteristics: projecting a point beam of energy at a surface location on the wheel, the point beam of energy impinging the surface location from a substantially orthogonal direction; sensing a reflection of the point beam of energy and producing therefrom an electrical analog signal representing the characteristic of the wheel; and digitizing the electrical analog signal to directly produce a digital output signal representing the characteristic of the wheel.

In still another aspect, the invention comprises a method for measuring in a contactless manner a physical characteristic of a wheel. This method includes: projecting along a projection axis a discrete beam of energy onto a surface of the wheel such that a reflection of the discrete beam of energy from the surface occurs along a reflection axis, the projection axis and the refection axis forming an oblique angle of less than 45°; sensing the reflection of the discrete beam of energy and producing an electrical analog signal therefrom representing the physical characteristic of the wheel; and digitizing the electrical analog signal to directly produce a digital output signal representing the physical characteristic of the wheel.

A system for measuring in a contactless manner a characteristic of a wheel is also presented. The system includes generating means for producing and projecting a point beam of energy at a surface location on the wheel such that the point beam of energy impinges the surface location from a substantially orthogonal direction. A sensor means senses the reflection of the point beam of energy from the wheel and produces therefrom an electrical analog signal representing the characteristic of the wheel. Digitizing means converts the electrical analog signal directly to a digital output signal representing the characteristic of the wheel. Finally, a beam deflector and associated control means automatically repositions the point beam of energy projected at the wheel to at least one other surface location on the wheel such that multiple digital output signals representative of the characteristic of the wheel can be produced.

In a further aspect, the invention comprises a system for simultaneously measuring in a contactless manner multiple characteristics of a wheel. The system includes multiple beam generators for generating and simultaneously projecting multiple point beams of energy at multiple surface locations on the wheel. Each point beam of energy comprises a unique signature signal and impinges the wheel from a substantially orthogonal direction. Multiple sensors are provided for sensing the reflections of the multiple point beams of energy from the wheel. Each sensor senses a respective reflection from the multiple point beams of energy. The respective reflection is indicative of a corresponding characteristic of the wheel. From the reflection, an electrical analog signal representing the corresponding characteristic of the wheel is produced. The system also includes means for digitizing the electrical analog signals to directly produce digital output signals representing the multiple characteristics of the wheel.

Further details and aspects of the invention are described and claimed herein.

As a more specific example, a wheel wear measurement system that will take all seven wheel wear measurements electronically is set forth herein. Preferably, the measurements are taken automatically upon proper positioning of a wheel over the measurement station. The obtained information is subsequently automatically stored in a computer controller's non-volatile memory. The wheel wear measurement station of the present invention consists of two primary components: a track mounted gaging station and a computer controller. A wiring harness connects the computer controller to the track mounted measuring station. The computer controller incorporates a keyboard, a display for user interface, and a remote printer; the gaging station incorporates the electronic sensors. Unique aspects of this invention include the following.

First, this invention increases the accuracy of the seven critical measurements, i.e. flange height, flange thickness, rim thickness, reference groove, flange throat profile, wheel "Gage" and wheel diameter by using electronic sensors located in the gaging station to acquire the measurement data.

Second, this invention preferably does not require that the gaging system be perfectly aligned with respect to the wheel before any measurement is taken. This is accomplished by providing a measurement system normal to the two axes of wheel motion.

Third, this invention preferably takes the readings automatically under computer control. Computer sensors take all the measurements and the computer controller processes the data to arrive at the flange thickness, flange height, rim thickness, reference groove and wheel diameter measurements. Concurrently, a scanner sensor located on the flange side of the wheel takes the flange height measurement and flange thickness measurement. Another scanner located on the inside of the wheel stores the rim thickness. A third scanner located on the outside of the wheel stores the reference groove measurement. A fourth scanner located just below the rail stores the cross-sectional profile of the wheel in the direction of wheel motion, which is related to the wheel diameter.

Fourth, the readings can be advantageously stored in a non-volatile memory of the computer controller. The data in the memory is retained, even when the system is turned off through a special memory back-up system.

Fifth, the present invention preferably uses low cost, high speed variable intensity, signature modulated laser scanners in the infrared region making it possible to use this invention inside or outside all year on new as well unclean and worn wheels.

BRIEF DESCRIPTION OF THE DRAWINGS

These and other objectives, features, aspects and advantages of the invention will be more readily understood from the following detailed description when read in conjunction with the accompanying drawings in which.

BEST MODE FOR CARRYING OUT THE INVENTION

Figure 1:
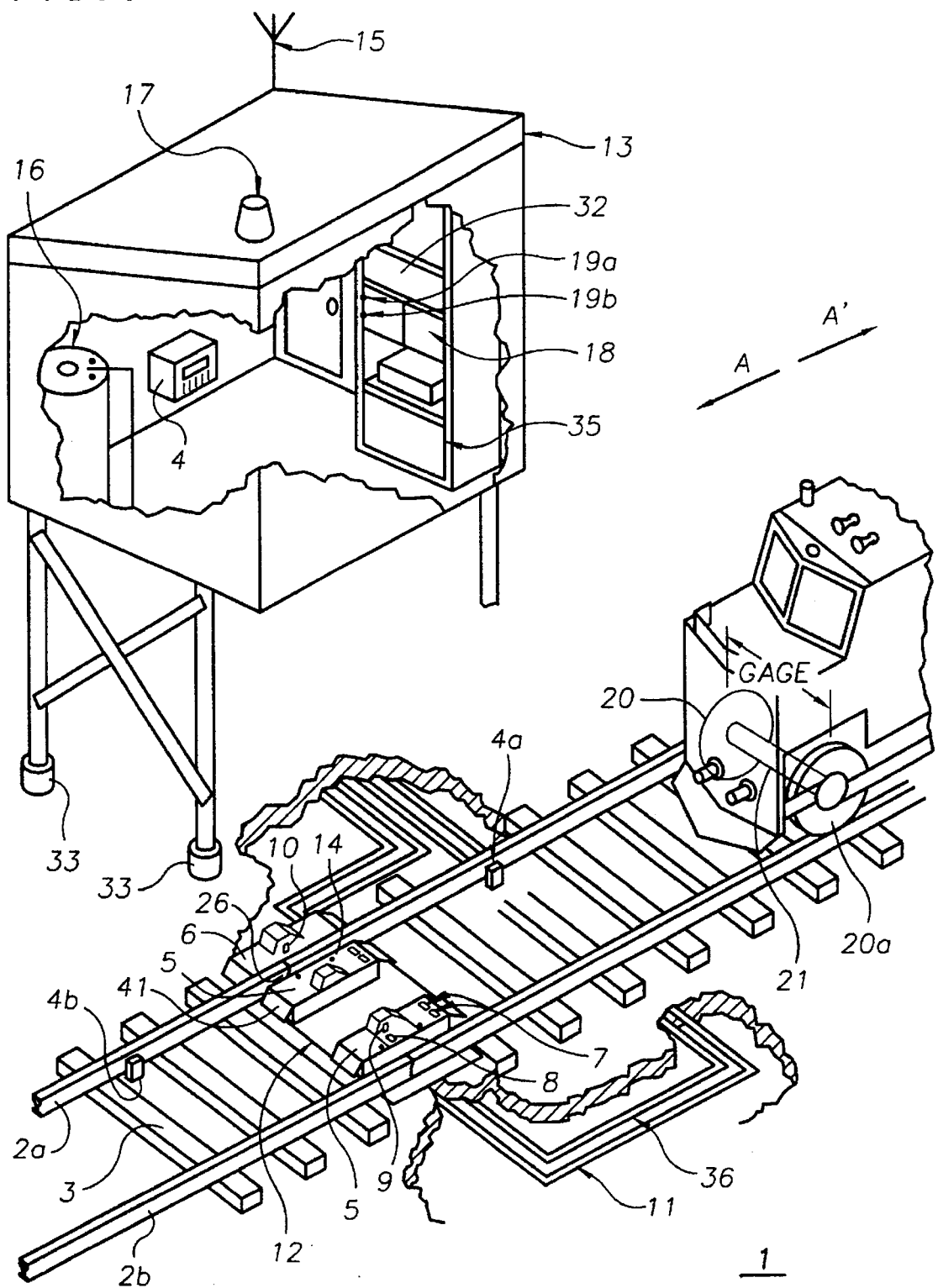
FIG. 1 is a perspective view of one embodiment of a wheel wear measurement system (WWMS) of the present invention shown ready to take readings on a train wheel.

A preferred embodiment of the wheel wear measurement system (WWMS) of the present invention, generally denoted as 1, is shown perspectively in FIG. 1. WWMS 1 includes a computer controller 18 attached to a scanner enclosure 5 and a scanner enclosure 6 through a wiring cable 36. The computer controller 18 is rack mounted on a nineteen-inch industry standard rack and can be readily serviced in the field for repair or replacement by opening four screws (not shown). Computer controller 18, which provides the computer control and data acquisition and storage functions for WWMS 1, is similar to commercially available industrial controllers such as Model IPC-19C available from IEM Corporation of Troy, N.Y. Results are displayed on a commercially available liquid crystal display 32 disposed above computer controller 18 mounted on rack 35. Computer controller 18 is 110-volt AC powered and can also be operated from an Uninterruptable Power Supply (UPS) (not shown) in known fashion. After a train has passed across WWMS 1, measurement data can be uploaded to a personal computer or other computer, printer, etc. via the standard communication port connector provided on all computer controllers.

Computer controller 18 is located in a well insulated housing 13 for environmental protection. Housing 13 incorporates a standard commercially available reversible air conditioning unit 34 capable of maintaining the temperature therein around a preferred seventy degrees Fahrenheit all year. Air conditioning unit 34 allows use of an inexpensive computer controller 18 capable of working only in controlled environmental conditions. Also, air conditioning unit 34 allows service of the entire system all year comfortably from within the housing.

Housing 13 accommodates an industrial grade air-compressor with a dry air supply tank 16 that supplies air for air-curtains (described below) in the WWMS 1. The housing supports an exterior status or warning light 17 which indicates the status of the WWMS 1 by, for example, emitting a steady red light indicating that WWMS 1 is actively measuring, a steady green light when WWMS 1 is in idle state, a blinking red light when one or more wheels are found out of acceptable tolerance, and a steady orange light when a WWMS 1 malfunction is detected. Housing 13 also has a lightening arrestor 15 to protect the unit in an environment where lightening strikes are possible. Lightening arrestor 15 is grounded using an industry standard copper grounding rod specified by Underwriter's Laboratory and well known in the industry. Housing 13 can be affixed to the ground using round poured concrete foundation anchors 33 on all four corners.

WWMS 1 scanner enclosure 5 and scanner enclosure 6, located by rail 2a and rail 2b, respectively (which are joined by a rail-tie 3) house laser scanner sensors (LSS) 7 through LSS 10. More specifically, scanner enclosure 5 houses flange thickness LSS 9, flange height LSS 8, precise wheel location detector array 14 (also referred to herein as separate detectors 14a, 14b, 14c), and diameter measuring LSS 7. Scanner enclosure 6, which is located on the outside of rail 2a, houses reference groove LSS 10. Each rail 2a and 2b, has its own scanner enclosure 5 and scanner enclosure 6 even though the rail 2b scanner enclosure 6 is not shown. As soon as a wheel 20a is positioned proximate to scanner enclosure 5 and scanner enclosure 6, precise wheel location detectors 14a, 14b 14c, precisely locate positioning of the wheel over the scanner enclosures. Precise wheel detector array 14 is further described below. As soon as the wheel is located and substantially centered with respect to LSS 7 through LSS 10, computer controller 18 takes the desired measurements.

Figure 2:
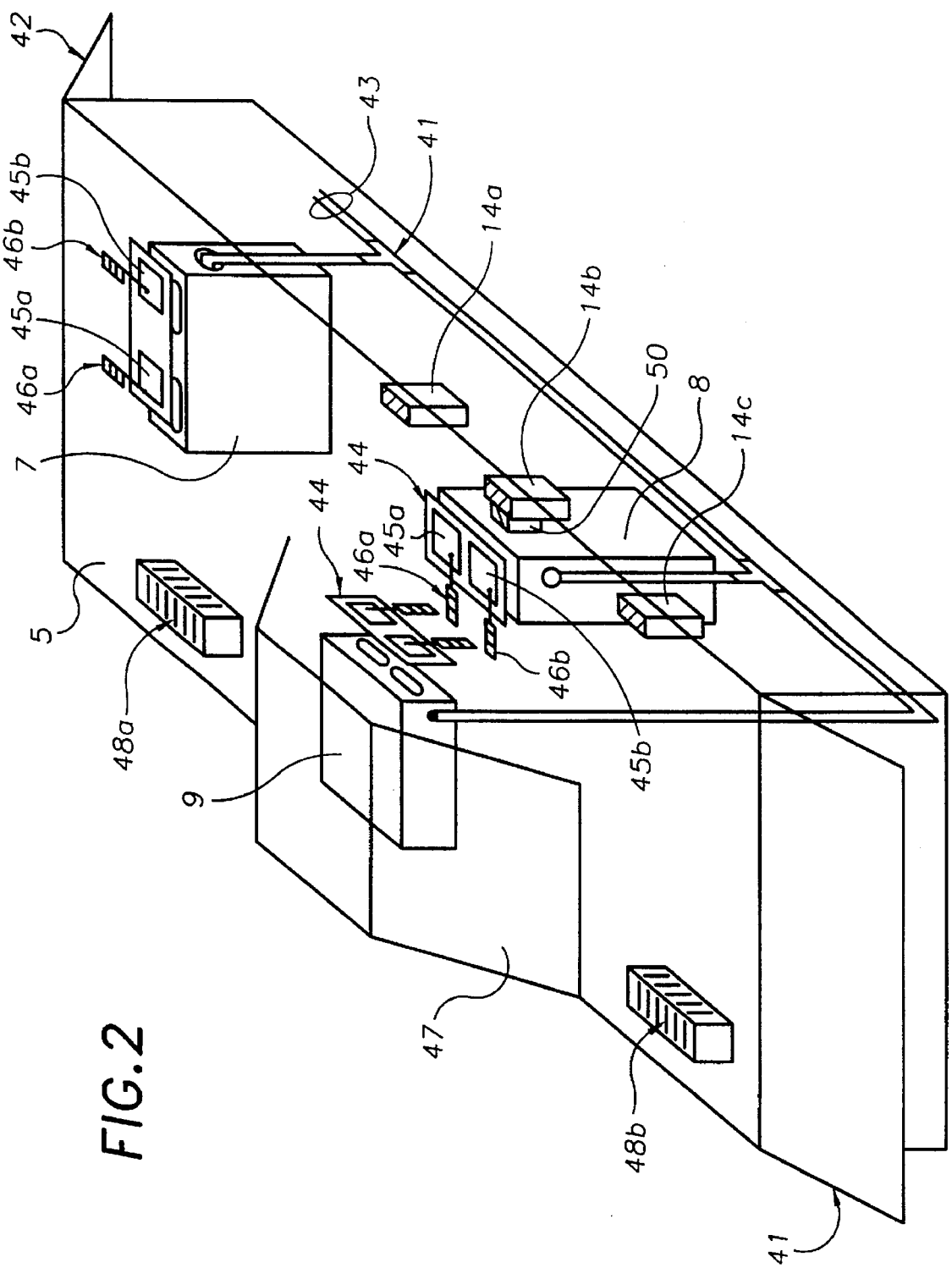
FIG. 2 is an enlarged perspective view of a scanner enclosure shown in FIG. 1.

The present invention employs two types of scanner enclosures. The first type of scanner enclosure 5 sits on the inside of rail 2a (or rail 2b) and houses rim thickness LSS 9, flange thickness LSS 8, and flange height LSS 8, as more fully detailed in FIG. 2. The second type of scanner enclosure 6 sits on the outside of the rail 2a or rail 2b and houses wheel reference groove LSS 10. Scanner enclosure 5, again located inside one of rails 2a and 2b, will first be described. Notice that the WWMS 1 of the present invention has to measure the left and right wheel on each axle 21; therefore, an identical set of LSS 7 to LSS 10 is associated with each rail 2a and 2b. To avoid repetition, only one set of the laser scanner sensors is described herein.

Scanner enclosure 5 is built from a thick gage steel which incorporates protection shield 41 and shield 42 to protect scanner enclosure 5 and the enclosed electronics against debris and external free hanging rolling stock parts such as brake shoes and cables. Protection shield 41 and shield 42 are preferably made out of thick gage steel to withstand external impacts from debris.

Furthermore, protection for other electronics is provided through thick gage steel shield 47.

The present invention is designed to operate in harsh and cold environments. Scanner enclosure 5 therefore incorporates two automatic temperature controlled heaters 48a and 48b. These heaters, preferably rated at two hundred or more watts, are temperature controlled using electronic thermostats known to one familiar with household heating accessories. Furthermore, heater 48a and heater 48b guarantee maintenance of the temperature within the enclosures within a desired temperature range, e.g., seventy to eighty degrees Fahrenheit. This temperature controlled environment for the electronics provides an inexpensive means to utilize inexpensive components that would ordinarily not operate in extreme cold temperatures. Scanner enclosure 5 also provides additional means of dirt and debris protection through an air curtain, such as commonly used in industrial applications to keep dust off parts. The air curtain is provided by air from dry air supply tank 16 carried through air supply hose 11 to the main air distribution pipe 43 connected to all the air distribution locations via air connection "tee" joints. Notice that the air curtains are established adjacent to the front panels of LSS 7 through LSS 10. The air curtain is activated by computer when a wheel 20a (FIG. 1) passes over scanner enclosure 5 to avoid any outside debris from getting on the LSS 7, 8, 9, and 10.

Additional protection from outside debris is provided through solenoid 46a and 46b activated shutters 45a and 45b, respectively, located inside a shutter frame 44. Other commercially available means to operate shutter assemblies such as a high-torque, geared-down electrical motor will work in place of solenoids 46a,46b. Shutter 45a and shutter 45b, described further below with reference to FIB. 9, are opened as soon as wheel presence is detected by a remote wheel detector 4a or 4b (FIG. 1), depending on the direction of traffic. Scanner enclosure 5 also has more precise wheel location detectors 14a, 14b, and 14c. These precise wheel location detectors provide an accurate means to trigger the wheel measurement process further described below. The precise wheel location detectors 14a, 14b, and 14c are known to the industry as inductive wheel sensors and are commonly available through vendors such as General Railway Signal of Rochester, N.Y.

An important feature of the WWMS 1 is a precise temperature-compensated ultrasonic or eddy-current distance measurement probe 50 (DMP). As the wheel 20a passes over DMP 50, the DMP takes several high speed successive measurements of the wheel flange 25 (see FIG. 3). By keeping the highest flange measurement among successive measurements, WWMS will have an independent flange height measurement that can be used to correct all other WWMS measurements.

Figure 3:
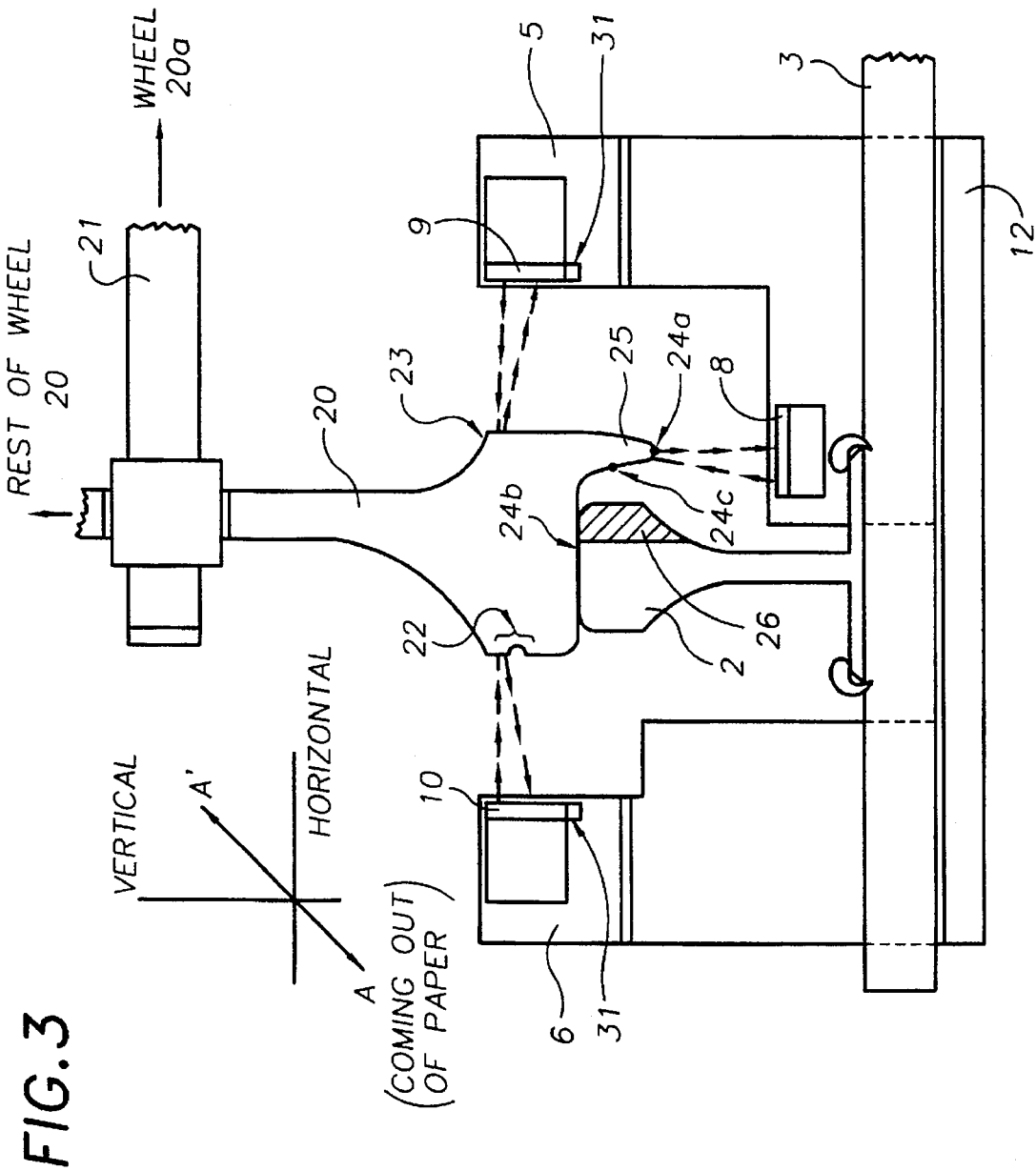
FIG. 3 is a cross-sectional view of the scanner enclosure sandwiching a wheel, taken in the direction of arrow A'.

FIG. 3 depicts a cross-sectional view of the measurement system as the user faces the system in the direction of the arrow A' shown in FIG. 1. Scanner enclosure 5 provides a rim thickness point 23 measurement using LSS 9, and a flange height point 24a measurement and a flange thickness point 24c measurement using LSS 8. Notice that flange 25 is part of wheel 20a mounted on the axle 21. Rail 2 has been slotted (see FIG. 4) to provide a rail slit 26 necessary for the LSS 8 light to scan at least up to wheel 20a tread surface point 24b. The wheel tread surface point 24b is also known as the taping point or taping line in the rail industry and described in the American Association of Railroads' (AAR) manuals G1 and G2. This point is used as a reference point in wheel 20a measurement calculations.

As already noted, another scanner enclosure 6 housing another LSS 10 with front bezel 31 is placed on the outside of the particular rail 2a or 2b to scan a reference groove 22 in wheel 20a necessary in some rolling stock measurements. Both scanner enclosure 5 and scanner enclosure 6 are rigidly mounted on a solid steel plate 12 located under the rail tie 3. Such a mounting arrangement provides a constant and rigid reference coordinate system between scanner enclosure 5 and scanner enclosure 6 irrespective of rail vibration as rolling stock rolls over the WWMS 1.

Figure 4:
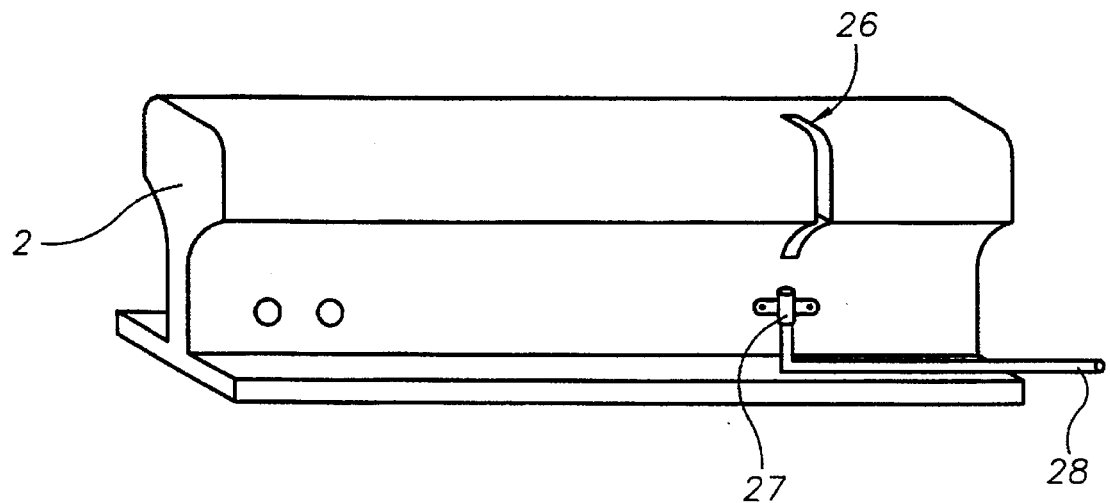
FIG. 4 is a perspective view of a modified rail segment.

The rail slit 26 is depicted in greater detail in FIG. 4 wherein an air curtain nozzle 27 is shown connected to the air supply hose 28, which would be further connected to the air supply hose 11 shown in FIG. 1. The air curtain nozzle 27 allows the system to keep the above mentioned rail slit 26 clean at all times.

Figure 5:
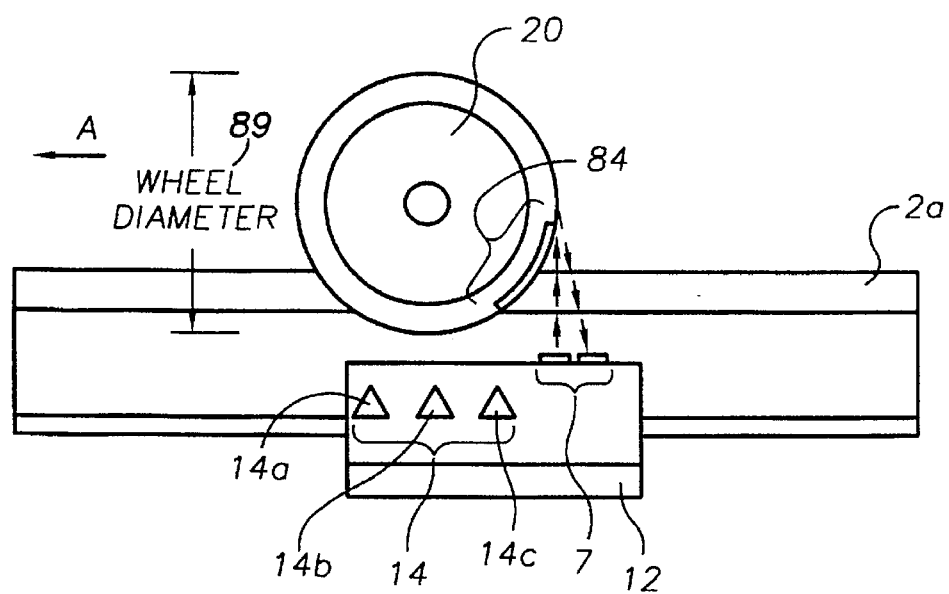
FIG. 5 is a side elevational view of a diameter measurement portion of the LSS and precise wheel location detectors array of the present invention.

FIG. 5 shows how LSS 7 is used to acquire wheel 20a diameter 89 scanned profile section (SPS) 84, where SPS is defined as a collection of measurement points. Notice also how the three precise wheel location detectors 14a, 14b, and 14c are located with respect to wheel 20a when wheel scanning is to be started. The output from the middle precise wheel location detector 14b will be the highest whereas the output from the outer two precise wheel location detectors 14a and 14c will be slightly lower and equal to each other. When computer controller 18 detects the necessary signal amplitudes, a start signal is issued. This signal is also used and referenced in other parts of the WWMS 1 operation.

Figure 6:
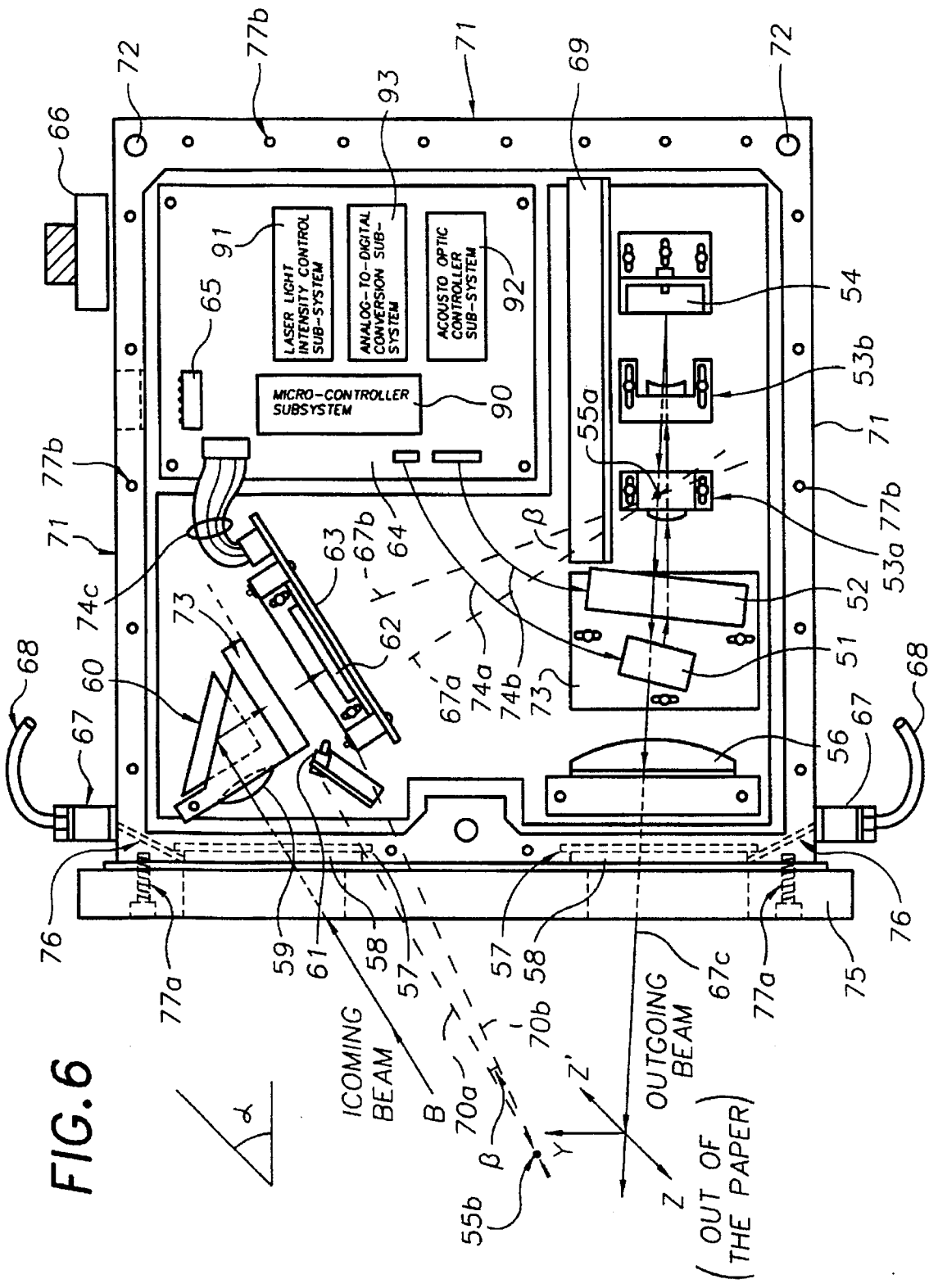
FIG. 6 is a top elevational view of an LSS in accordance with the present invention, such as shown in FIG. 2 and FIG. 3.
Figure 6A:
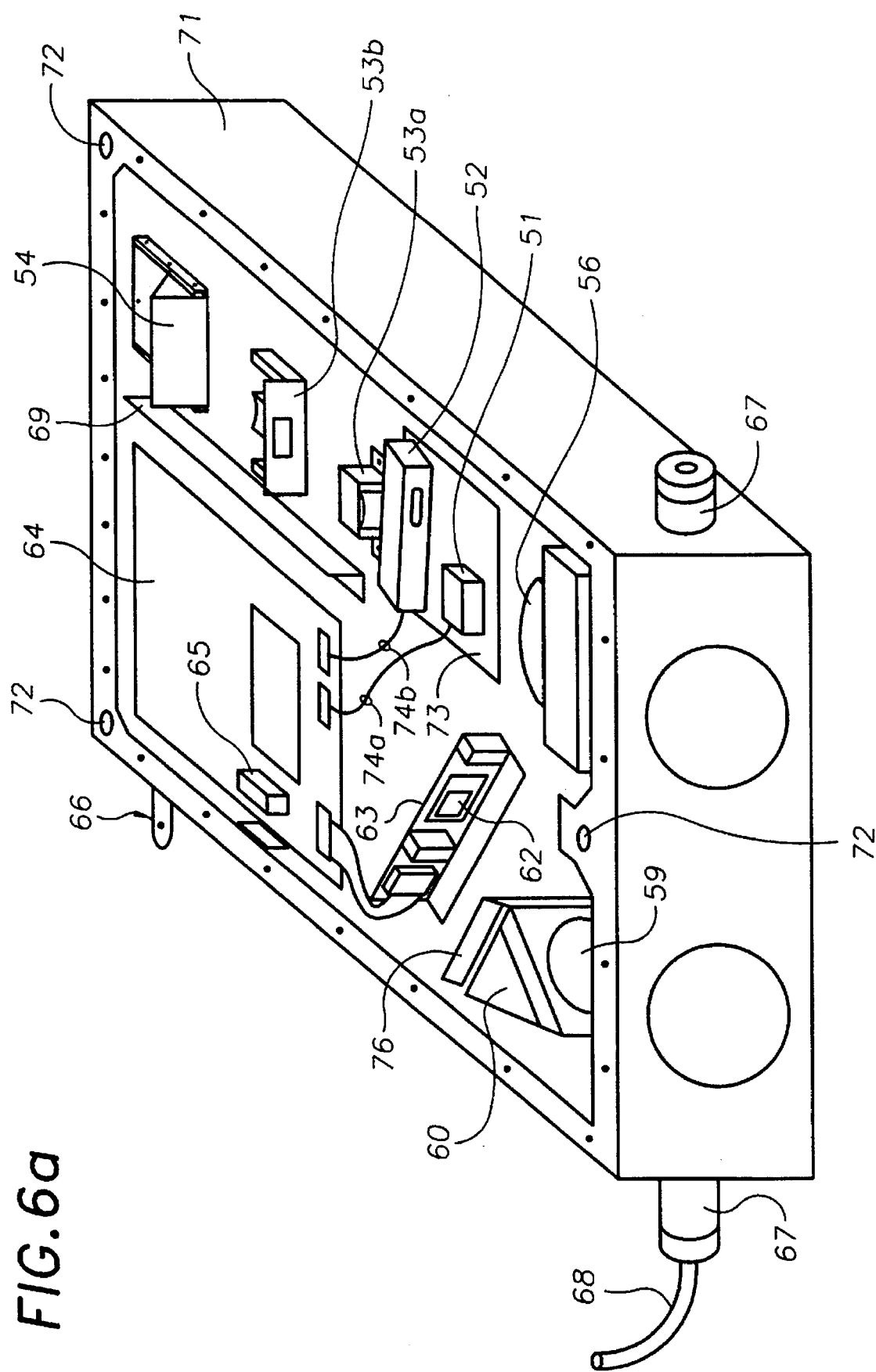
FIG. 6a is a perspective view of the LSS embodiment detailed in FIG. 6.

FIG. 6 shows a plan view of one of the LSS used in this invention, and FIG. 6a shows a perspective view of the LSS for additional detail. All of the LSS are identical in construction except for scan coverage and standoff distance. The LSS preferred embodiment uses a laser triangulation method known to anyone familiar with optical metrology. The LSS positions the beam one point at a time, cross-sectionally on the wheel normal or transverse to the direction of wheel travel, with the help of an acousto-optic beam positioning method, and makes the distance measurement at that point using laser triangulation. The LSS then continues to scan other points of interest along the wheel cross-section in a very small time interval during which wheel 20a is considered essentially stationary. In the preferred embodiment of the present invention, the main advantage of acousto-optic beam positioning is directly addressable measurement positioning, resulting in a direct point measurement at high speeds.

If medium-to-slow speed operation is acceptable, a galvo-based beam positioning method can be used. Also, if an entire surface measurement scan is desired with no need for a complete point-by-point measurement, one can use other full beam scanning methods, such as a rotary motor scanner, resonant scanner, or optical line generator. The LSS preferred arrangement depicted in FIG. 6 utilizes a near-infrared collimated laser source 51 such as a commercially available low power laser diode. The laser light source 51 is desirable due to its singular wavelength, narrow beam divergence, easy intensity control, long operation life, convenient laser on-time control, and immunity to vibration over conventional light sources such as strobe light and bulbs.

The light coming from the laser source 51 is modulated with a square-wave waveform, for example in the 40 KHz to 80 KHz range, in the preferred embodiment. The modulation is accomplished using an off-the-shelf square-wave waveform generator which is part of LSS controller 64. The modulation signals are passed on to the laser source 51 through electrical cable 74a. The laser source 51 light then passes through a commercially available acousto-optic deflector 52, such as Model Number CTI-4080-2 available from Crystal Technology of Palo Alto, Calif. The acousto-optic deflector 52 serves the purpose of deflecting the passing laser light in a manner known to the industry, and is connected to the LSS controller 64 via the cable 74b.

Other benefits associated with the acousto-optic deflector 52 are an all solid-state operation with no moving parts for high reliability and vibration immunity. Alternatively, a multi-faced reflecting mirror, similar to grocery counter bar-code scanning motors, could be employed. Such a mirror could be mounted on a high speed scanning motor in place of acousto-optic deflector 52. One may choose to utilize other scanning methods such as resonant scanning, galvo scanning, laser line generating optics in other embodiments of the present invention.

The laser light further passes through additional optics 53a and 53b for beam shaping, and is reflected back from a 180-degree folding mirror 54 through the front plano-convex lens 56. Folding mirror 54 is an off-the-shelf, 180-degree folding mirror available from vendors such as Edmund Scientific. This arrangement utilizing folding mirror 54 allows the beam to travel twice the distance before emerging from the front plano-convex lens 56, thereby reducing the needed package length. The beam leaves the LSS through the plano-convex lens 56, where upon the beam reflects off the wheel and is received back through a double convex lens 59. A light baffle 69 is provided alongside the light path to avoid any light interference between the outgoing beam and the incoming scattered beam. The light baffle 69 is, for example, a black colored aluminum right angle strip fastened in place.

The light beam scattered back from a wheel being scanned will travel in the direction of arrow B. The scattered light passes through the double convex lens 59, reflects through the right angle folding mirror 60 located in folding mirror-mount 73 and forms a point optical impression on the two dimensional photoelectric array 62 mounted on a simple circuit board 63 for ease of connections.

Notice that double convex lens 59 is mounted at a 30-degree angle to the laser light source. This is shown as angle e in FIG. 6. Small values of angle α between laser source 51 and photoelectric array 62 result in a compact design for the LSS. Values for angle α smaller than 30-degree in FIG. 6 are also possible. Also, notice that photoelectric array 62 mounting line 70b is not parallel with the double convex lens folding mirror 60 mounting line 70a, which passes through extrapolated point 55b. Photoelectric array 62 makes a small angle β with the folding mirror line 70a. This angular positioning, i.e. angle β, of the photodetector array 62 is critical to assuring that, throughout the range of measurements, a scattered light impression on the array will always be in sharp focus thereon. In other words, with proper attention to such angular positioning, i.e. angle β, the focus of the impression is independent of the distance between LSS 7,8,9,10 and wheel 20a. If attention is not paid to this important angular positioning of the photodetector array 62 with respect to the double convex lens 59 and folding mirror 60, then the focus of a scattered light impression will change throughout the range of measurements, and will thus cause significant measurement accuracy differences. Geometry underlying this angular positioning is further described below.

The entire optical arrangement described in FIG. 6 and FIG. 6a is kept inside a solid machined vibration immune enclosure 71 with locational holes 72 for easy mounting. The front of each light opening is covered with a high-quality sapphire window and an optical filter 58, held in place by the front bezel 75 through hex screws 77a. Felt paper gasket 57 is placed behind each sapphire window and optical filter 58 to seal the internal optics from dirt. The sapphire window and optical filter 58 allow only the laser source's 51 wavelength light to pass through. The sapphire window and optical filter 58 are kept clean by an air curtain supplied through air line 68 connected to front bezel 75, which supplies air via line 76. Note that air line 68 would be connected to main air supply 11 shown in FIG. 1. The entire LSS arrangement is connected to the rest of the electronics through a rugged connector 66. The LSS controller 64, a standard micro-controller such as an Intel 8031 processor, has status lights 65 visible from outside even when the entire arrangement is fully enclosed with a gasketed, tight top cover.

Figure 7:
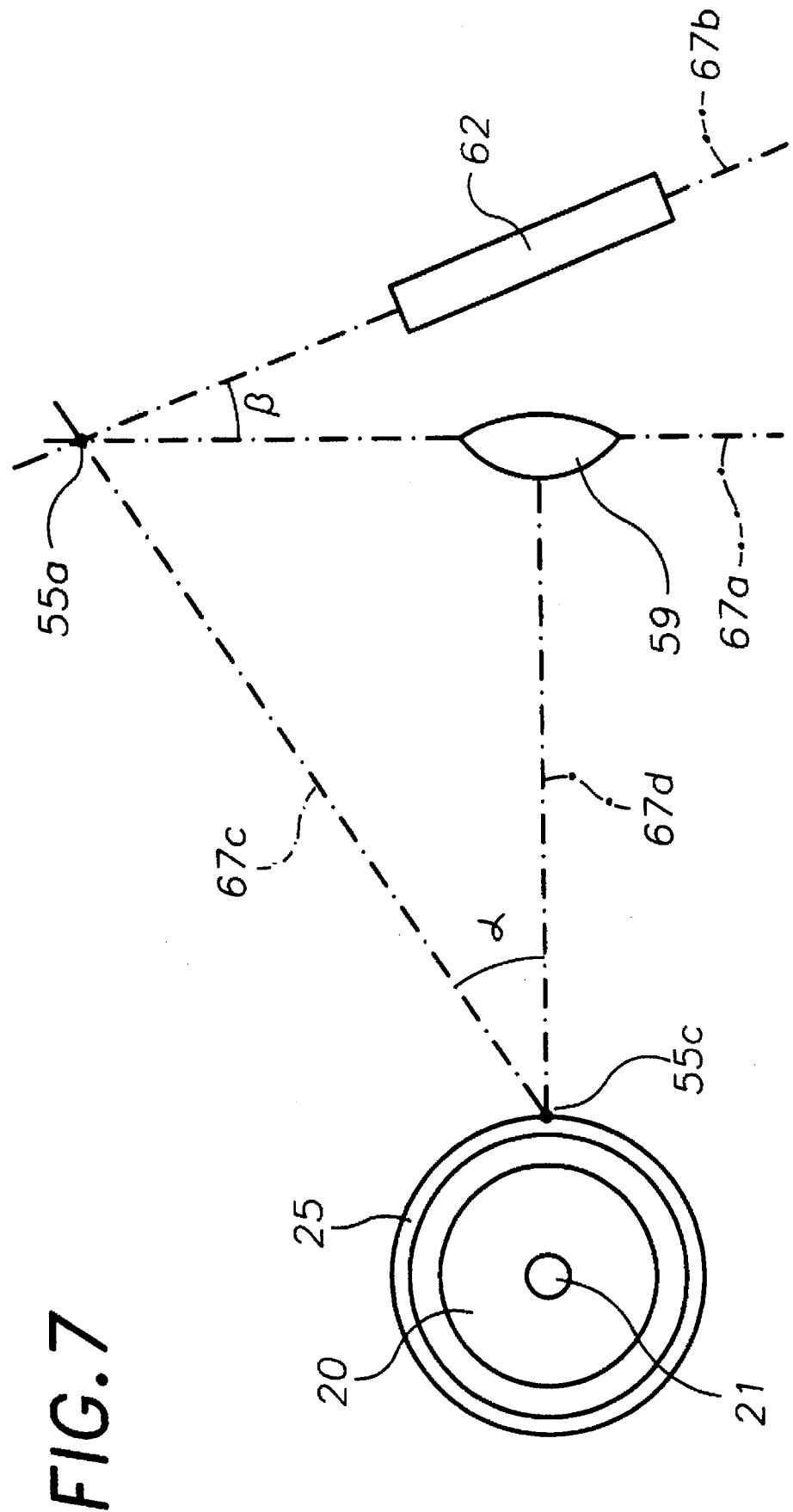
FIG. 7 is an optical schematic of a preferred operational embodiment of the laser scanner sensor (LSS) presented herein.

Important geometry (referenced above) to achieving a sharp focus is drawn in FIG. 7. The double convex lens 59 is oriented to view wheel 20 and lies generally along a viewing axis 67d. The double convex lens 59 which lies in a plane 67a that is normal both to the plane of FIG. 7 and to viewing axis 67d. The viewing axis 67d and the projection axis 67c intersect at a point 55c on wheel 20. Also, the surface of the photodetector array 62 lies along a line which intersects projection axis 67c at the same point where projection axis 67c is intersected by plane 67a containing double-convex lens 59. Such a line for the photodetector array 62 is represented by line 67b, and can be seen to intersect projection axis 67c and plane 67a at a point 55a.

The photodetector array 62 may occupy different angular orientations, but will only perform with the high accuracy proposed by the present invention if the "point 55a" intersection geometry described above is observed. This means that photodetector array 62 will have to be located behind the double-convex lens 59 on line 67b, and line 67b lies in the plane of FIG. 7. However, in the preferred embodiment, use of folding mirror 60 allows relocating of photodetector array 62 so as to make the package smaller (see FIG. 6). Notice that the above described angular orientation, i.e. angle β between line 67a and line 67b, is preserved in the present orientation of the photodetector array 62 by repeating the same angle β as the angle between line 70a and line 70b. The above described geometry and orientation is also known in the optics field as the Scheimpflung condition. The Scheimpflung condition can also be achieved by using a variety of other mirror and lens combinations. It will be apparent to those skilled in this art that various modifications, substitutions and the like can be made to the above described geometry and orientation using the Scheimpflung condition without departing from the spirit of the invention.

The photoelectric array 62 is of the type commercially available and known as a Charge Coupled Device (CCD) array, or Position Sensitive Device (PSD), or just photoelectric array, composed of a two dimensional array of a sufficient number of photo-sensitive elements to meet accuracy needs. In an alternate embodiment, one can use a single dimension photoelectric linear array. However, a two dimensional array is preferred in all cases to detect light impression shift in two directions without easily causing "an out of focus" condition.

Once again, right angle folding mirror 60 is used to obtain a smaller package size in the preferred embodiment. Light level calibration at run-time is achieved through a calibration light-emitting-diode 61 (LED) located in close proximity to photoelectric array 62. The calibration is achieved through turning on the calibration LED 61 at a known light level intensity and making light level measurements in the photoelectric array 62 similar to other calibration techniques where a known stimulus is used.

Figure 8:
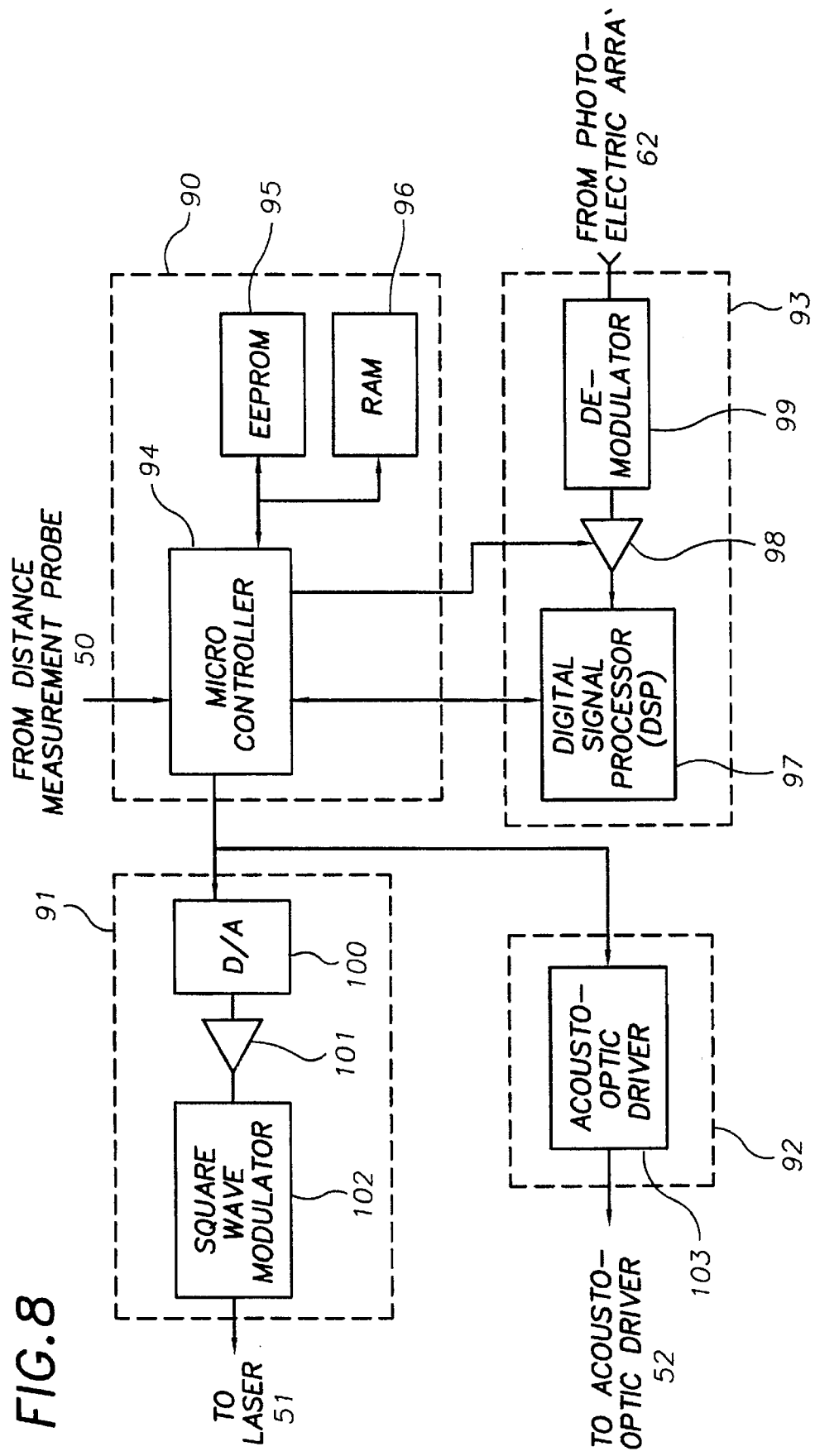
FIG. 8 is a block diagram for the electronics control of the wheel wear measurement system (WWMS) in accordance with the present invention.

As shown in FIG. 8, the circuitry of LSS controller 64 consists of four subsystems: controller subsystem 90, data acquisition subsystem 93, light level control subsystem 91, which controls laser source 51, and acousto-optic deflector (52) control subsystem 92. Controller subsystem 90 provides the intelligence and memory for the system and includes a conventional 8-bit single chip micro-controller 94, e.g. an INTEL 8031 processor. The assembly program code for the controller is stored in the associated 32-KiloByte EEPROM 95. The size of EEPROM 95 can be increased, depending on a specific application need. Any conventional CMOS-EEPROM with these storage capabilities will meet the requirements of the present invention. In order to store assembly program variable data and measurement data, the LSS controller 64 is provided with a 640-KiloByte Non-Volatile, low power CMOS-RAM 96.

Data acquisition subsystem 93 consists of a conventional Digital Signal Processor (DSP) 97, waveform demodulator 99, and output voltage scaling-amplifier 98. The input to DSP 97 is scaled up/down using digitally controlled scaling-amplifier 98 in order to measure small signal voltages. As shown in FIG. 6, the input to the data acquisition subsystem 93 consists of measurement data from any one of the LSS 7,8,9,or 10 photoelectric array 62, which is connected to the LSS controller 64 through cable 74c. DSP 97 digitizes the light impression imposed on the photoelectric array 62 by converting the photoelectric array's element light levels to digital voltage in a manner well known.

Laser (51) light control sub-system 91 serves to control the intensity of the modulated laser light coming out of laser 51. Depending on the surface reflectivity and response from the photoelectric array 62 (see FIG. 6), the intensity of the light level can be varied accordingly. The laser (51) light control sub-system 91 further consists of an industry standard 12-bit digital-to-analog converter (D/A) 100, which provides digital control of a current regulator 101 to vary the light intensity. D/A 100 also controls the turn-on time for laser 51. The present invention greatly benefits through the precise laser 51 on/off timing control and synchronization with the photoelectric array 62 to provide adequate immunity against ambient light interference. The output from the current regulator is modulated to provide the modulated laser 51 light necessary to achieving ambient light immunity when needed.

If insufficient light level is detected, D/A 100 can be stepped-up to produce higher laser 51 intensity and/or scaling-amplifier 98 can be stepped-up to detect a smaller light level under micro-controller 94 control thus forming a simple software-controlled automatic-gain-control system (AGC). It will be apparent to those skilled in the art that various modifications, substitutions and the like can be made to the AGC without departing from the spirit of this invention; for example, a separate single element photodetector can be incorporated using a beam splitter to quickly and effectively measure incoming light level without examining photoelectric array 62. The acousto-optic control sub-system 92 is also well-known to anyone familiar with the acousto-optic controls commercially available from optical technology companies, such as Crystal Technology of Palo Alto, Calif.

Figure 9:
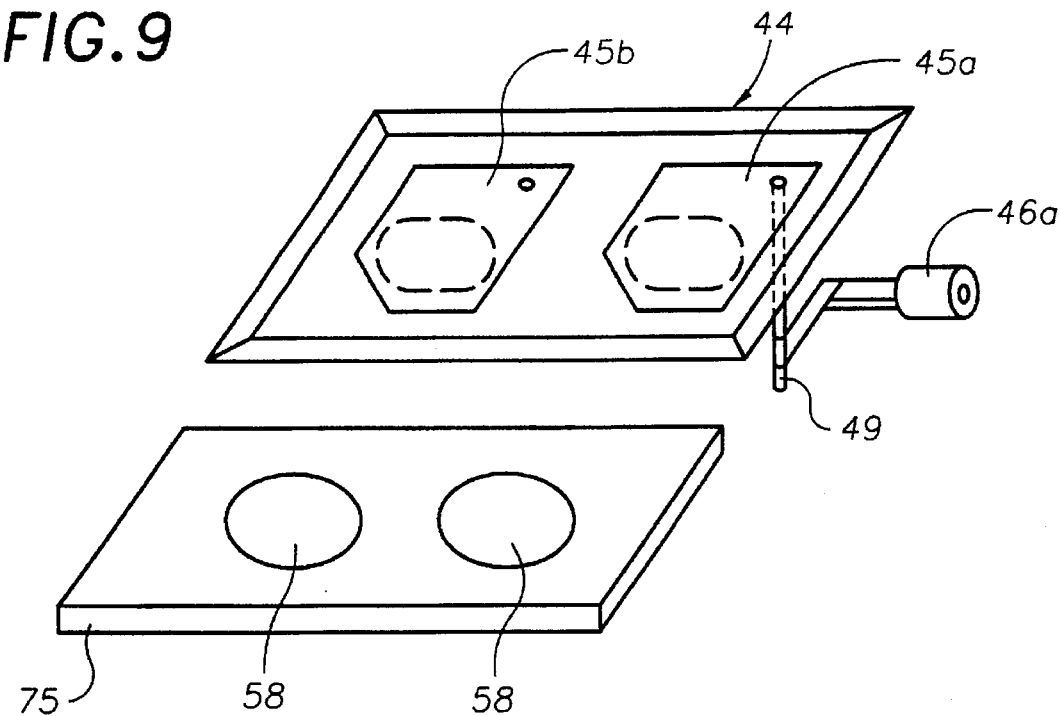
FIG. 9 is a perspective view of the shutter mechanism generally shown in FIG. 2.

FIG. 9 depicts the shutter mechanism 45a, 45b mentioned earlier. Only when incoming traffic is detected are shutters 45a and 45b opened. Shutter 45a or shutter 45b is moved by activating the respective solenoid 46a or 46b, connected to the shutter plate shaft 49. When solenoid 46a is activated through an electrical signal in known fashion, shutter 45a opens to allow light to pass through. All shutters are controlled similarly. Again, shutters 45a and 45b serve to keep dust and debris away from the optics. Notice that shutters 45a and 45b are located in front of bezel 75 and are each associated with a different one of the light sapphire windows and optical filters 58. When a train wheel traveling in direction of arrow A, shown in FIG. 1, passes over remote wheel detector 4a, computer controller 18 activates solenoids 46a and 46b to open light shutters 45a and 45b to allow the WWMS 1 to take measurements. Remote wheel detector 4b can be used to determine whether a last wheel in a train has passed over WWMS 1 using average train speed computed by computer controller 18 and perform a "time-out" function after the last wheel has passed to close shutter 45a and shutter 45b.

Figure 10:
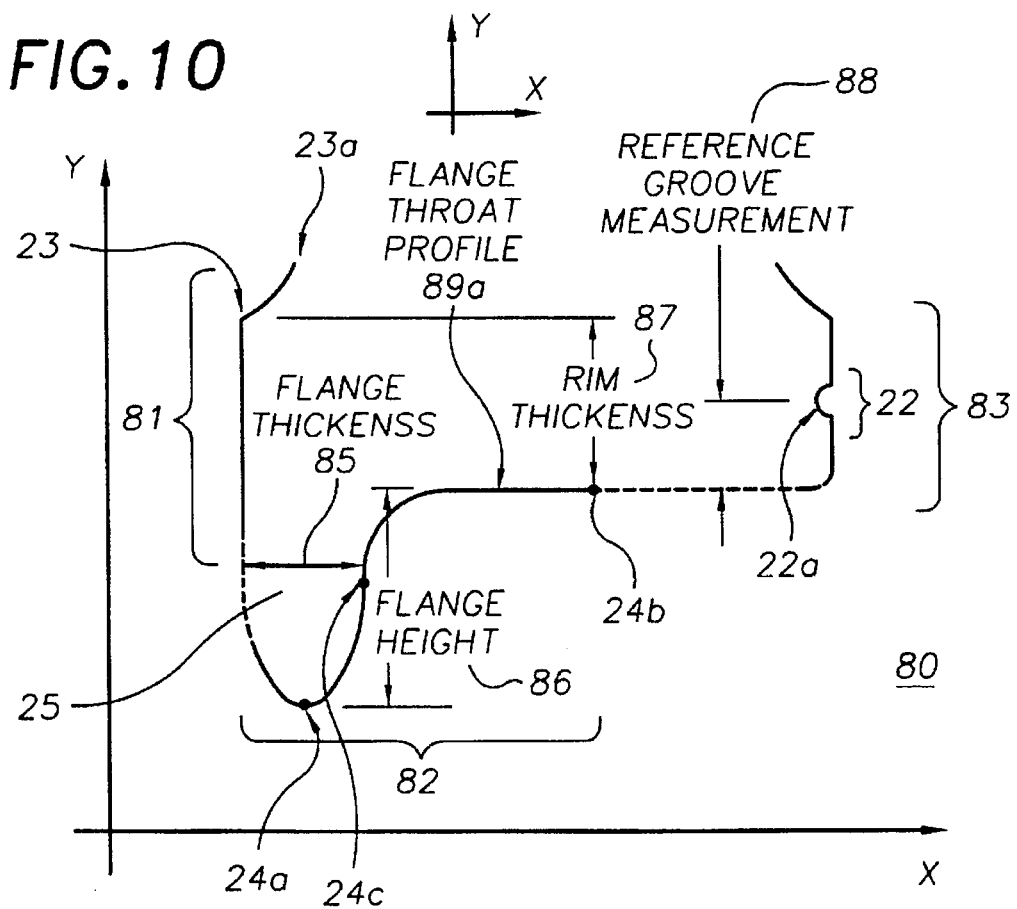
FIG. 10 is a two-dimensional plot showing a substantially complete wheel cross section profile arrived at by combining different sets of x-y points of the profile.
Figure 11:
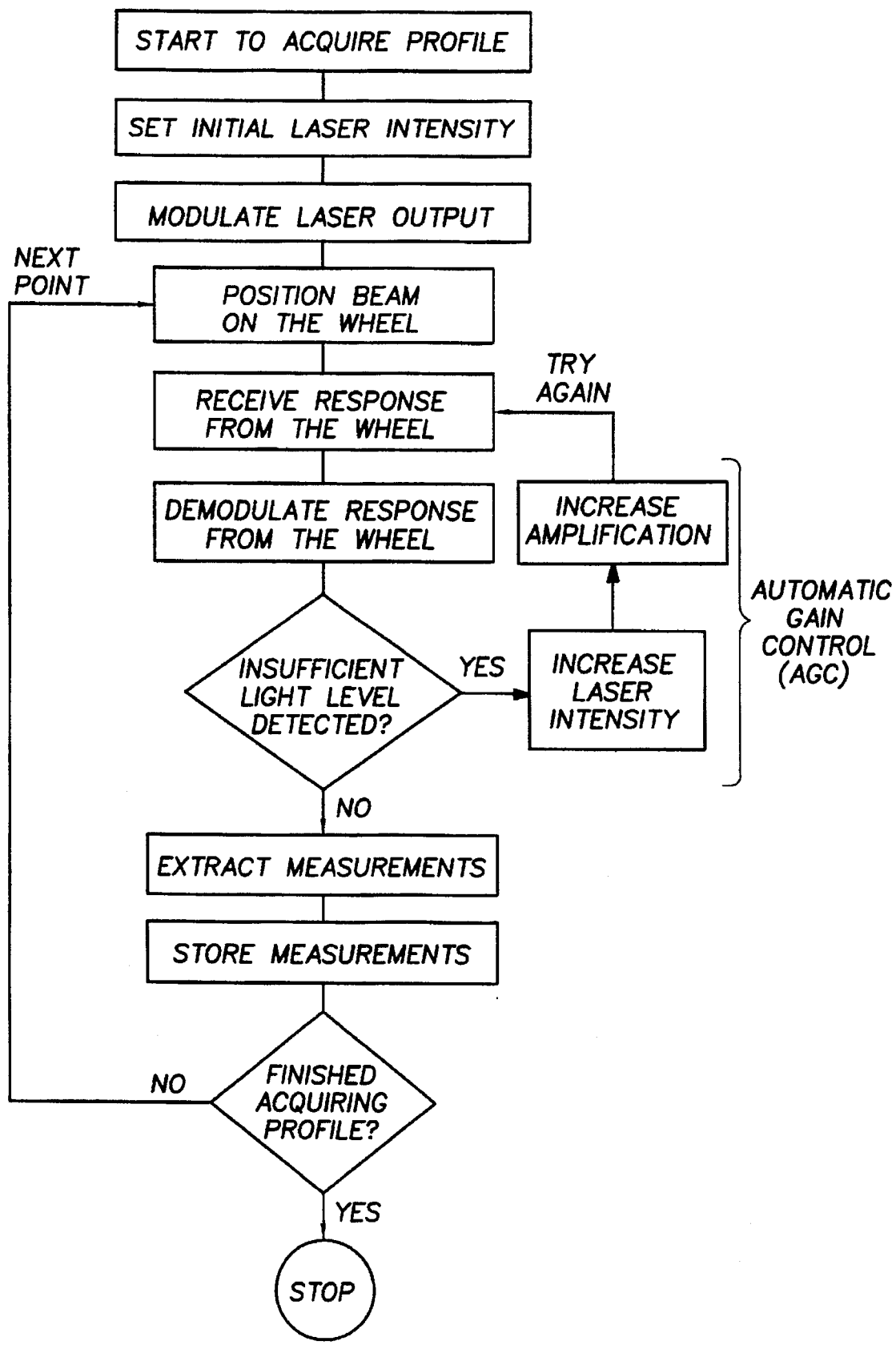
FIG. 11 is a flowchart of one embodiment of the wheel profile measurement process in accordance with the present invention.
Figure 12:
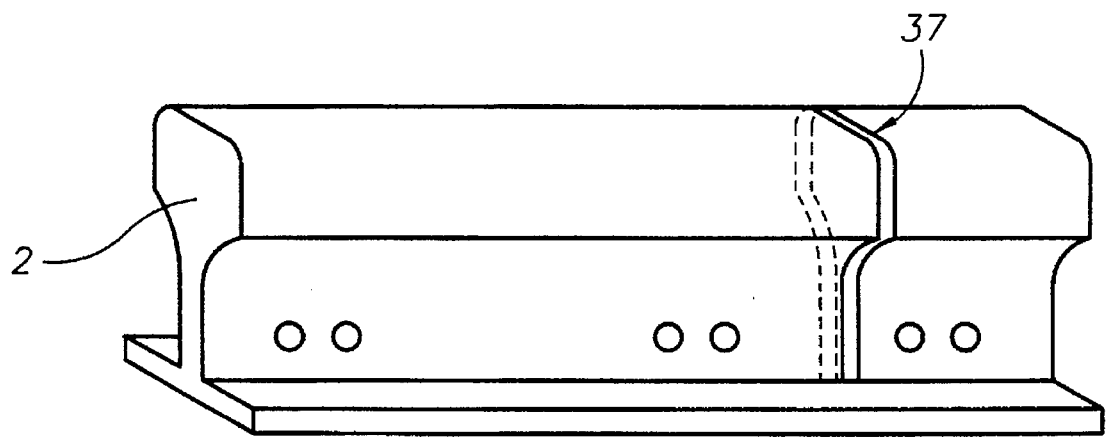
FIG. 12 is a perspective view of a rail joint used in an alternate embodiment of the present invention.

FIG. 10 shows how all the scanned profile sections (SPS) 81 to 83 can be combined to approximate a complete wheel profile, generally denoted as 80. Notice that the preferred embodiment of the present invention gages only small subsets of data points, called scanned profile subsets (SPS), in the areas of measurement dimensions. ASPS can be a collection of only two or three points. As opposed to a prior-art camera-image based systems where the entire wheel image is acquired and processed, the preferred embodiment of the present invention acquires only a few points, resulting in quick response and direct measurements in the areas of key wheel dimensions (described above). The rim thickness measurement (87) LSS 9 provides part of the SPS 81 necessary to arrive at the rim thickness point (23) measurement. The flange thickness and flange height LSS 8 provides SPS 82 up to tread surface point 24b and is used to calculate flange thickness (85) and flange height (86) measurements. The reference groove LSS 10 provides SPS 83 necessary to extract reference groove 22 and reference groove measurement 88. The solid lines in FIG. 10 indicate wheel profile subsets (collection of measurement points), whereas the dashed lines indicate hypothetical profile filled in by the computer for clarity purposes. With the help of a commercially available measurement extraction program such as WHEEL-PROF by IEM of Troy, N.Y., all the desired measurements are calculated. FIG. 10 also indicates wheel dimensions corresponding to the measurements. The wheel diameter 89 is calculated by first acquiring SPS 84 through diameter LSS 7 as shown in FIG. 11. Once the scanned profile 80 is available, a computer curve fitting program extrapolates the entire wheel circumference. Wheel diameter 89 is derived by using the mathematical equation circumference divided by $\pi$ (3.14).

Another measurement possible with the present invention is the wheel "Gage" measurement (see FIG. 1). A wheel "Gage" measurement is defined as the distance between wheel 20a and wheel 20b mounted on axle 21. This distance can be derived by calculating the distance between the rim thickness point 23 measurement on each wheel (20a, 20b) mounted on axle 21. Notice that flange throat profile 89a (shown as a thick line in FIG. 10) is automatically acquired as part of the LSS 8 scan. The main algorithm steps used in the wheel measurement program are described next. Notice how the rim thickness measurement 87, flange thickness measurement 85, flange height measurement 86, and reference groove measurement 88 can be obtained from the assembled profile 80.

The first step in measurement extraction involves cleaning up the assembled profile 80 by correcting the SPSs 81 to 83 for light impression distortion if any, as would be understood by one familiar with dynamic signal processing. The present invention obtains all desired measurements in a very small time-interval, during which the wheel can be considered essentially stationary. However, if the wheel moves while measurement is taking place, some accommodation for reflection distortion due to movement has to be provided. In order to correct for measurement distortion due to movement, the velocity of the wheel has to be calculated. The calculated velocity is then used to generate data correction using basic trigonometry. The velocity of the wheel can be calculated from four independent points, for example, flange height point 24a, determined from four separate scan profiles 80. As shown below, using the velocity, the radius of the wheel can be calculated. By comparing the derived and the measured radius, a measurement correction factor is calculated. The following equations show the calculations for velocity and radius using four points.

Given any four data points on the perimeter of the wheel:

$p_1=(t_1,y_1)$ $p_2=(t_2,y_2)$ $p_3=(t_3,y_3)$ $p_4=(t_4,y_4)$ where: t is time and y is the distance from a point on the perimeter of the wheel to an arbitrary but fixed point in space in a direction perpendicular to the rail.

Determine the wheel radius R, velocity v and center where $p_c=(t_c, y_c)$ is time and center height when wheel center is in line with gage.

First sample on wheel perimeter $$R^2=[v \cdot (t_3-t_c)]^2+(y_3-y_c)^2 \qquad (1)$$

Second sample on wheel perimeter $$R^2=[v \cdot (t_1-t_c)]^2+(y_1-y_c)^2 \qquad (2)$$

Third sample on wheel perimeter $$R^2=[v \cdot (t_2-t_c)]^2+(y_2-y_c)^2 \qquad (3)$$

Fourth sample on wheel perimeter $$R^2 = [v \cdot (t_4 - t_c)]^2 + (y_4 - y_c)^2 \quad (4)$$

Subtract (2) from (1) and solve for $t_c$:

$$t_c = \frac{-[v^2 \cdot (t_1^2 - t_2^2) + y_1^2 - 2 \cdot y_1 y_c - y_2^2 + 2 \cdot y_2 \cdot y_c]}{2 \cdot v^2 \cdot (t_2 - t_1)} \quad (5)$$

Subtract (3) from (1) and solve for $t_c$:

$$t_c = \frac{-[v^2 \cdot (t_1^2 - t_3^2) + y_1^2 - 2 \cdot y_1 y_c - y_3^2 + 2 \cdot y_3 \cdot y_c]}{2 \cdot v^2 \cdot (t_3 - t_1)} \quad (6)$$

Subtract (4) from (1) and solve for $t_c$:

$$t_c = \frac{-[v^2 \cdot (t_1^2 - t_4^2) + y_1^2 - 2 \cdot y_1 y_c - y_4^2 + 2 \cdot y_4 \cdot y_c]}{2 \cdot v^2 \cdot (t_4 - t_1)} \quad (7)$$

Subtract (6) from (5) and solve for $y_c$:

$$y_c = \frac{v_2 \cdot \frac{(-t_3 + t_2) \cdot t_1^2 + (t_3 - t_1) \cdot t_2^2 + (-t_2 + t_1) \cdot t_3^2}{(-t_2 + t_1) \cdot y_3 + (-t_3 + t_2) \cdot y_1 + (t_3 - t_1) \cdot y_2} + \frac{(-t_2 + t_1) \cdot y_3^2 + (-t_3 + t_2) \cdot y_1^2 + (t_3 - t_1) \cdot y_2^2}{(-t_2 + t_1) \cdot y_3 + (-t_3 + t_2) \cdot y_1 + (t_3 - t_1) \cdot y_2}}{2} \quad (8)$$

Subtract (7) from (5) and solve $y_c$:

$$y_c = \frac{v_2 \cdot \frac{(-t_4 + t_2) \cdot t_1^2 + (t_4 - t_1) \cdot t_2^2 + (-t_2 + t_1) \cdot t_4^2}{(-t_2 + t_1) \cdot y_4 + (-t_4 + t_2) \cdot y_1 + (t_4 - t_1) \cdot y_2} + \frac{(-t_2 + t_1) \cdot y_4^2 + (-t_4 + t_2) \cdot y_1^2 + (t_4 - t_1) \cdot y_2^2}{(-t_2 + t_1) \cdot y_4 + (-t_4 + t_2) \cdot y_1 + (t_4 - t_1) \cdot y_2}}{2} \quad (9)$$

Subtract (9) from (8) and solve for v:

$$v = \sqrt{\frac{\frac{(-t_2 + t_1) \cdot y_4^2 + (-t_4 + t_2) \cdot y_1^2 + (t_4 - t_1) \cdot y_2^2}{(-t_2 + t_1) \cdot y_4 + (-t_4 + t_2) \cdot y_1 + (t_4 - t_1) \cdot y_2} - \frac{(-t_2 + t_1) \cdot y_3^2 + (-t_3 + t_2) \cdot y_1^2 + (t_3 - t_1) \cdot y_2^2}{(-t_2 + t_1) \cdot y_3 + (-t_3 + t_2) \cdot y_1 + (t_3 - t_1) \cdot y_2}}{\frac{(-t_3 + t_2) \cdot t_1^2 + (t_3 - t_1) \cdot t_2^2 + (-t_2 + t_1) \cdot t_3^2}{(-t_2 + t_1) \cdot y_3 + (-t_3 + t_2) \cdot y_1 + (t_3 - t_1) \cdot y_2} - \frac{(-t_4 + t_2) \cdot t_1^2 + (t_4 - t_1) \cdot t_2^2 + (-t_2 + t_1) \cdot t_4^2}{(-t_2 + t_1) \cdot y_4 + (-t_4 + t_2) \cdot y_1 + (t_4 - t_1) \cdot y_2}}} \quad (10)$$

Calculate constant vertical center $y_c$ using (9):

$$y_c = \frac{v_2 \cdot \frac{(-t_4 + t_2) \cdot t_1^2 + (t_4 - t_1) \cdot t_2^2 + (-t_2 + t_1) \cdot t_4^2}{(-t_2 + t_1) \cdot y_4 + (-t_4 + t_2) \cdot y_1 + (t_4 - t_1) \cdot y_2} + \frac{(-t_2 + t_1) \cdot y_4^2 + (-t_4 + t_2) \cdot y_1^2 + (t_4 - t_1) \cdot y_2^2}{(-t_2 + t_1) \cdot y_4 + (-t_4 + t_2) \cdot y_1 + (t_4 - t_1) \cdot y_2}}{2} \quad (11)$$

Calculate time of horizontal center $t_c$ using (5):

$$t_c = \frac{-[v^2 \cdot (t_1^2 - t_2^2) + y_1^2 - 2 \cdot y_1 y_c - y_2^2 + 2 \cdot y_2 \cdot y_c]}{2 \cdot v^2 \cdot (t_2 - t_1)} \quad (12)$$

Calculate constant wheel radius R using (1):

$$R = \sqrt{[v \cdot (t_1 - t_c)]^2 + (y_1 - y_c)^2} \quad (13)$$

Alternately, using the signal from the precise wheel location detectors 14a, 14b & 14c, it is possible to calculate the velocity of wheel movement since the precise wheel location detectors 14a, 14b, and 14c are a fixed distance apart, and wheel 20a movement can be timed to arrive at the velocity and impression correction. The following equations show the calculations for velocity and radius necessary to generate the corrections.

For the case of three samples equally spaced in time the equations reduce to:

$$t_2 = t_1 + \Delta t \quad (14)$$

where $\Delta t$ is the sampling period.

$$t_3 = t_1 + 2 \cdot \Delta t \quad (15)$$

$$t_4 = t_1 + 3 \cdot \Delta t \quad (16)$$

$$v = \frac{1}{\Delta t} \cdot \sqrt{\frac{\frac{(-y_4^2 - 2 \cdot y_1^2 + 3 \cdot y_2^2)}{(-y_4 - 2 \cdot y_1 + 3 \cdot y_2)} - \frac{(-y_3^2 - y_1^2 + 2 \cdot y_2^2)}{(-y_3 - y_1 + 2 \cdot y_2)}}{\frac{-2}{(-y_3 - y_1 + 2 \cdot y_2)} + \frac{6}{(-y_4 - 2 \cdot y_1 + 3 \cdot y_2)}}} \quad (17)$$

$$v = \frac{1}{\Delta t} \cdot \sqrt{\frac{(-y_4^2 - 2 \cdot y_1^2 + 3 \cdot y_2^2) \cdot (-y_3 - y_1 + 2 \cdot y_2) - (-y_3^2 - y_1^2 + 2 \cdot y_2^2) \cdot (-y_4 - 2 \cdot y_1 + 3 \cdot y_2)}{2 \cdot (y_4 - y_1 + 3 \cdot y_2 - 3 \cdot y_3)}} \quad (18)$$

$$y_c = -\frac{3}{2} \cdot \frac{(-y_4{}^2 - 2 \cdot y_1{}^2 + 3 \cdot y_2{}^2) \cdot (-4 \cdot y_3 - 2 \cdot y_1 + 5 \cdot y_2 + y_4) - (-y_3{}^2 - y_1{}^2 + 2 \cdot y_2{}^2) \cdot (-y_4 - 2 \cdot y_1 + 3 \cdot y_2)}{(y_4 - y_1 + 3 \cdot y_2 - 3 \cdot y_3) \cdot (-y_4 - 2 \cdot y_1 + 3 \cdot y_2)} \quad (19)$$

$$t_c = \frac{1}{2} \cdot \Delta t + t_1 + \frac{1}{2} \cdot \frac{(y_2{}^2 - 2 \cdot y_2 \cdot y_c - y_1{}^2 + 2 \cdot y_1 y_c)}{(v^2 \cdot \Delta t)} \quad (20)$$

$$R = \sqrt{\frac{1}{4} \cdot \left[ v \cdot \Delta t + \frac{(2 \cdot y_c - y_2 - y_1) \cdot (y_1 - y_2)}{v \cdot \Delta t} \right]^2 + (y_1 - y_c)^2} \quad (21)$$

Other means to measure wheel velocity, such as an off-the-shelf laser velocimeter, can also be used. Alternatively, the wheel diameter 89 (see FIG. 5) obtained from a scan 84 taken at two different time intervals can be used to precisely track wheel location movement by mathematically solving the relationship, obvious to one skilled in geometry, between wheel 20 and LSS 7 necessary to generate profile corrections for application to a profile, acquired by LSS 8 when LSS 8 operation timing is not exact. As described in FIG. 10, different SPSs of the wheel profile, such as flange SPS 82, reference groove SPS 83, and rim thickness SPS 81, are combined to arrive at a complete profile 80 for wheel 20a.

Profile 80 is treated as a two-dimensional plot of x-y points. A lowest point is determined by traversing the profile point-by-point. This lowest point corresponds to flange height point 24a. The next step is to traverse the x-y scan profile 80 starting from point 23a. The traversing is stopped when the difference between the rim thickness point's (23) x-coordinate and tread surface point's (24b) x-coordinate is equal to taping line distance as defined by AAR's Manual G1 and G2, discussed above and known to one skilled in the art. Having determined the taping line x-coordinate, the profile is then traversed backwards until the y-distance between the tread surface point's (24b) y-coordinate and the point's (24c) y-coordinate equals the gaging point distance above the taping line. Gaging point, also well described in AAR's Manual G1 and G2, corresponds to the flange thickness point.

Next, the difference between the x-coordinates of the tread surface point 24b and rim thickness point 23 is computed. This difference comprises flange thickness 85. The difference between the y-coordinate of the tread surface point 24b (also called taping line point) and y-coordinate of flange height point 24a comprises the flange height 86. Notice that rim thickness point 23 is defined by a slope change when traversing the x-y profile starting at point 23a. As shown in FIG. 20, the rim thickness measurement 87 is computed by calculating the difference between the y-coordinates of rim thickness point 23 and the tread surface point 24b. The reference groove measurement 88 is then calculated by looking for slope change in the SPS 83 and defining the reference groove point 22a as the lowest point in the reference groove 22. The reference groove measurement 88 is calculated as the difference between the y-coordinates of reference groove point 22a and tread surface point 24b.

Obtaining profile 80 of wheel 20a using WWMS 1 described in this invention's preferred embodiment is next discussed with reference to FIGS. 1, 6, 8 & 11. The micro-controller 94 sets the initial intensity of the laser source 51 by writing a digital word corresponding to nominal laser intensity to the D/A converter 100 which in turn controls laser current regulating power supply 101. The output signal from the current regulating power supply is optionally modulated by a square-wave waveform signal through square-wave modulator 102 and the resulting signal drives laser source 51. When laser source 51 modulation is enabled, each laser scanner sensor, LSS 7–LSS 10, will be modulated at a different square-wave wave waveform to avoid interference there between. Note that modulator 102 is enabled only when photoelectric array 62 is not a CCD type. Only a photodetector type photoelectric array, or PSD type photoelectric array 62, can take advantage of the modulation technique to improve ambient light immunity.

Micro-controller 94 also controls acousto-optic driver 103 to position the energy beam at a certain location on wheel 20a. In a preferred embodiment, the response from the photoelectric array 62 is next optionally demodulated using waveform demodulator 99. Also, the output signal is amplified through gain-selectable scaling-amplifier 98 and processed through Digital Signal Processor (DSP) 97. If insufficient light level is detected, D/A 100 control value is increased to produce higher laser intensity. Also, the scaling-amplifier 98 gain can be increased to detect small light levels. As D/A 100 and the scaling-amplifier are controlled by micro-controller 94, these components form a simple software-controlled automatic-gain-control (AGC). The control software is executed from EEPROM 95, and the acquired measurements are stored in CMOS-RAM 96. After adequate scattered light level is detected, the measurement point is calculated and stored. The next point is similarly acquired until the desired number of points in the profile are obtained.

As depicted in FIGS. 12–16, various alternate embodiments of the present invention are possible. For example, rail 2a and rail 2b can be provided with a slit 37 (FIGS. 12 & 13) across the entire cross-section of the rail. The flange height measurement 86 and flange thickness measurement 85 LSS 8' could be located on the outside of the rail in scanner enclosure 6' at an angle. The flange thickness measurement (85) LSS 8' is similar in construction to LSS 8 discussed above. However, LSS 8' would utilize different components to provide a larger scan width, and LSS 8' scans flange 25 from the outside.

Figure 14:
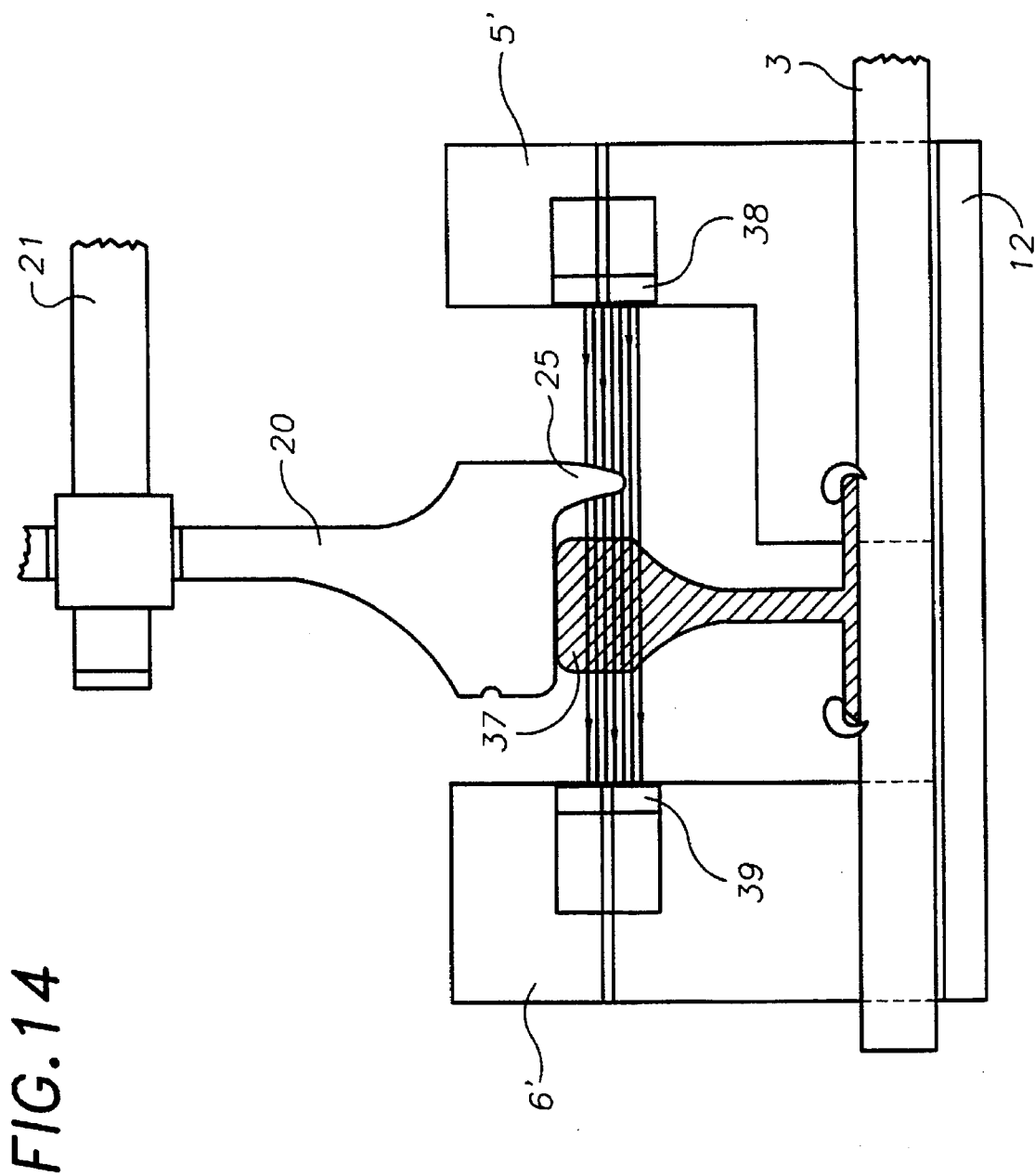
FIG. 14 is a cross-sectional view of another embodiment of the present invention, depicted in the direction of arrow A' shown in FIG. 1, capable of taking flange height measurement using a laser-curtain method.

Another alternate means to measure flange height measurement 86 is presented in FIG. 14 where a laser curtain consisting of parallel laser beams coming out of a laser curtain transmitter 38 and a laser curtain receiving means 39 are used to measure height of flange 25. This is accomplished by counting the beams that pass uninterrupted by flange 25, and are received by the laser curtain receiving means.

In another alternate embodiment of the present invention, acousto-optic deflector 52 can be replaced with a different means of beam scanning, such as rotary-motor scanning, resonant scanning, galvo scanning, or other optical beam positioning means, or line generation means such as a laser line generator from, e.g., like Edmund Scientific of Barrington, N.J. (Point beam and line beam scanning approaches are collectively referred to herein as "discrete" beam systems and should be contrasted with conventional image based systems.) The resulting embodiment will acquire a line impression of the laser source 51 beam projected along the scanned wheel direction (see FIG. 10). A high resolution, impression quality based on a small form-factor arrangement will be achievable by following the angular positioning and optics orientation considerations described above with reference to FIG. 7.

Evaluation of a profile 80 of wheel 20a acquired by this embodiment of the invention is next described. The micro-controller 94 establishes the initial intensity of the laser source 51 by writing a digital word to D/A 100 (FIG. 8) which in turn controls laser current regulating power supply 101. The output signal from current regulating power supply 101 is next optionally modulated by a square-wave waveform through square-wave modulator 102 and the resulting signal drives laser source 51. Note that modulator 102 is enabled only when the photoelectric array 62 is not CCD type. Micro-controller 94 also controls a laser line generation means used instead of acousto-optic deflector 52 to create a laser line at a certain location on the wheel. Alternately, one can use a simple optical laser line generator, together with an electrically operated optical shutter, instead of an electrically operated laser line generator such as a rotary mirror, etc. In this alternate embodiment, the response from the photoelectric array is next optionally demodulated using waveform demodulator 99. If insufficient scattered light level is detected, the D/A converter 100 control value is increased to produce higher laser intensity and/or scaling-amplifier 98 gain is increased to detect a smaller light level. After adequate response light levels have been detected, a laser line impression is stored. The next impression in a transverse cross-section of the wheel is then similarly acquired.

Figure 15:
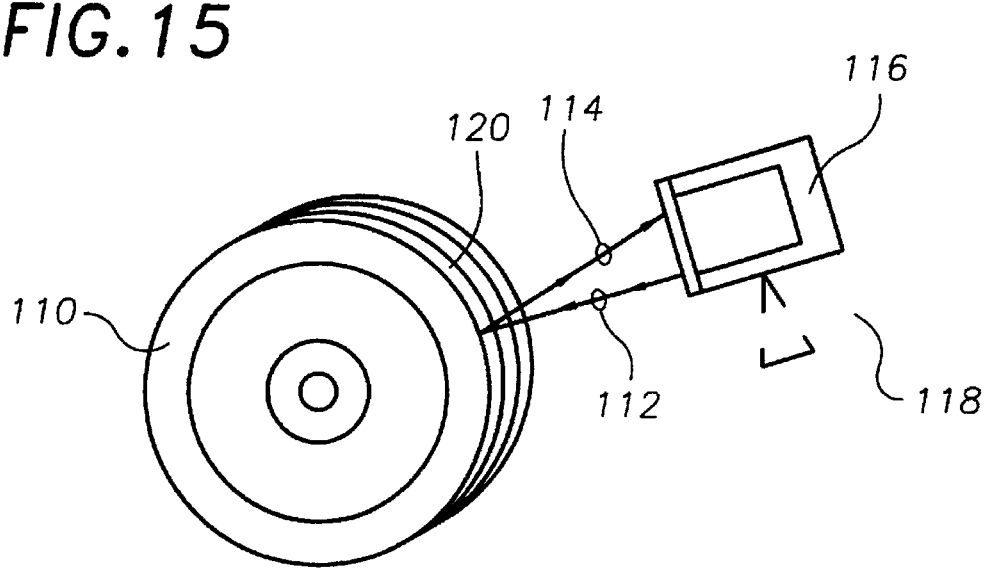
FIG. 15 is a partial perspective view of an alternate application for laser scanner sensor (LSS) in accordance with the present invention.
Figure 13:
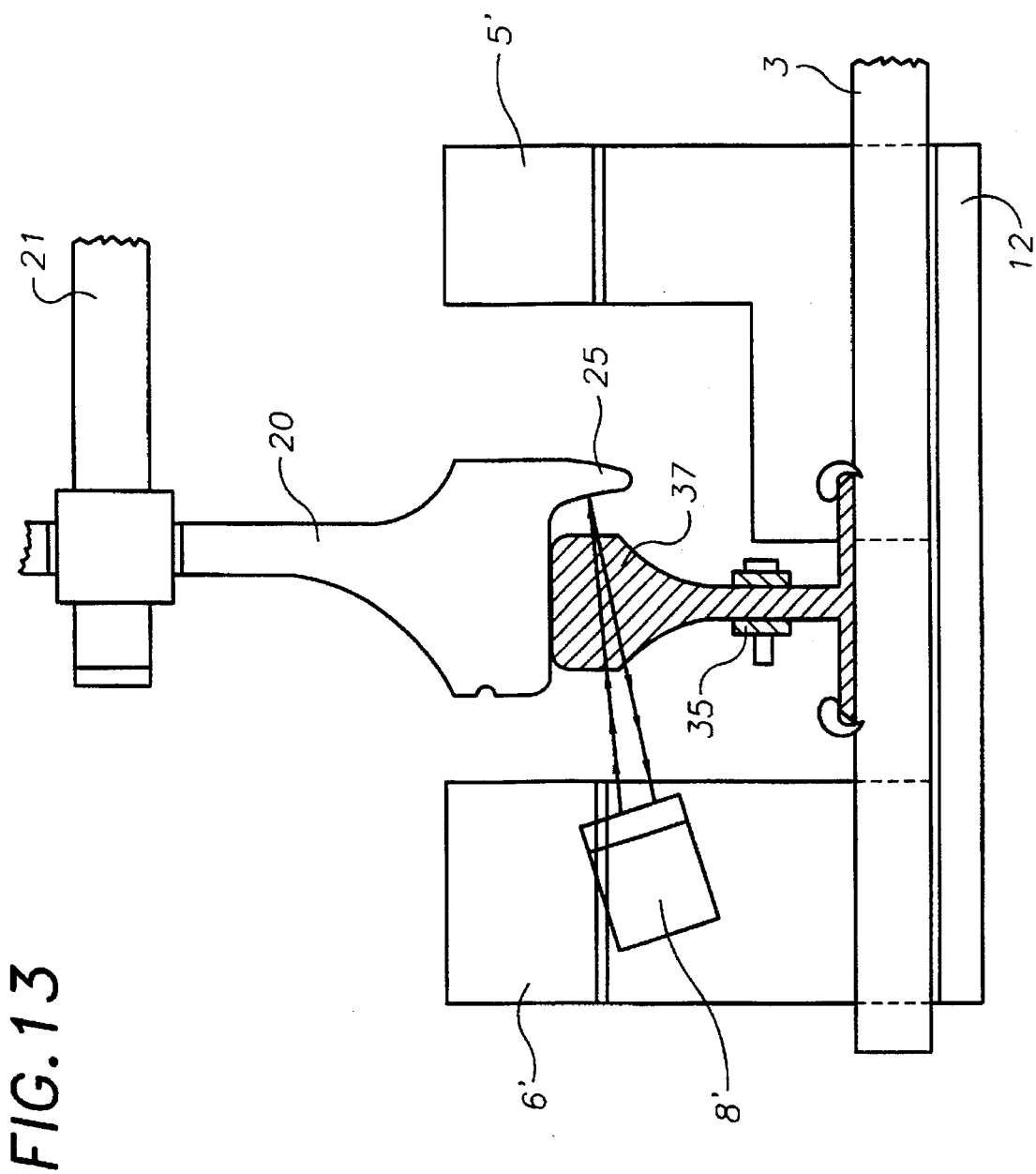
FIG. 13 is a cross-sectional view of another embodiment of the present invention, depicted in the direction of arrow A' shown in FIG. 1, capable of taking flange thickness measurement, flange height measurement, and reference groove measurement using only a single point of measurement located on the outside of the rail.

In another application of the present invention depicted in FIG. 15, the laser scanner sensor (LSS) described herein is used to attain a rubber tire 110 tread profile measurement. An outgoing laser beam 112 reflects off tread surface 120. Reflected beam 114 is processed by the LSS to measure and record tread surface 120 depth.

Figure 16:
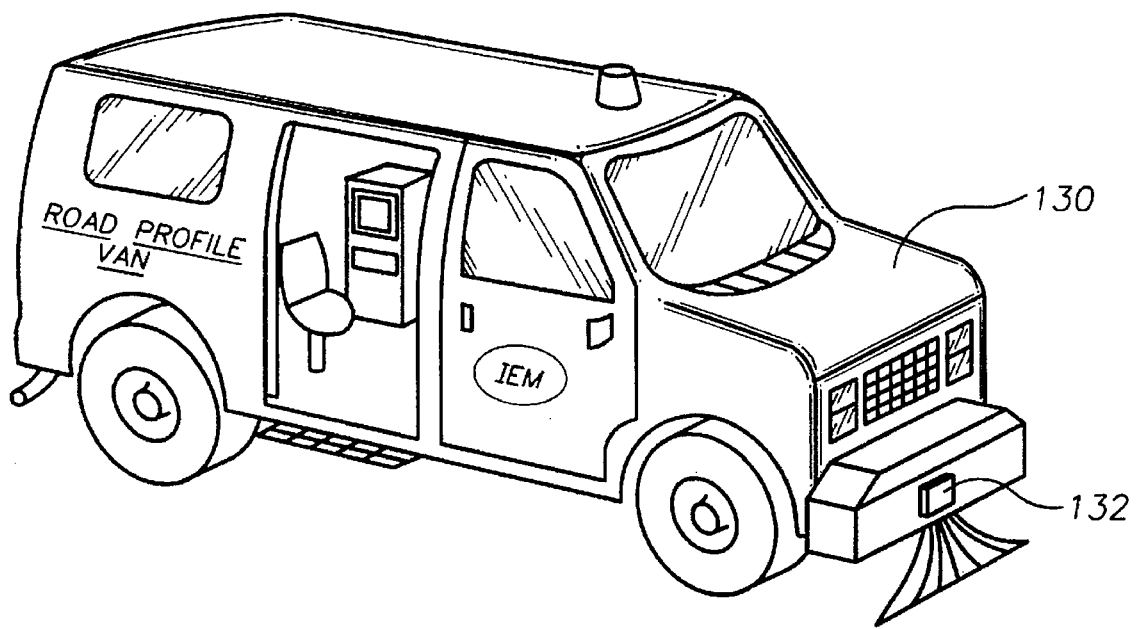
FIG. 16 depicts a perspective view of still another application of the LSS of the present invention, wherein the LSS is shown mounted to a vehicle to function as a road surface profiler.

In still another application of the present invention, depicted in FIG. 16, the LSS can be mounted to a van 130 to act as a road surface profiler 132 for acquiring a road surface profile or monitoring road surface texture. The road surface profiler 134 will accumulate the entire road surface profile as van 130 is driven on the road. In order to use the preferred embodiment in the road surface texture measurement application, a double convex lens 59 (see FIG. 6) of smaller focal length is used instead to sense a reflection from a longer surface length without needing an extraordinary long photoelectric array 62. The road surface cross-section profile will measure exposed surface-stone texture height and depth of texture-surface voids such as pot-holes.

Although several embodiments of the invention have been described and depicted, it will be apparent to those skilled in this art that various modifications, substitutions and the like can be made without departing from the spirit of the invention, the scope of which is defined by the claims appended hereto.

We claim:

1. A method for measuring in a contactless manner a characteristic of a wheel, said method comprising the steps of:

(a) projecting a point beam of energy at a surface location on the wheel, said point beam of energy impinging said surface location from a substantially orthogonal direction and impinging said surface location only at a point;

(b) sensing a reflection of said point beam of energy from said wheel and producing therefrom an electrical analog signal representing said characteristic of said wheel;

(c) digitizing said electrical analog signal to directly produce a digital output signal representing said characteristic of said wheel; and (d) automatically repositioning said point beam of energy projected at the wheel to a new surface location traverse a radial circumference of the wheel and repeating said steps (b) & (c) for at least one new surface location on the wheel.

2. The method of claim 1, further comprising the step of collecting said digital output signals to define said characteristic as a profile subset of said wheel.

3. The method of claim 1, wherein said wheel is rotating in a direction of movement and said step (d) comprises automatically repositioning said point beam of energy projected at the wheel in a direction transverse to said direction of movement.

4. A method for measuring in a contactless manner a characteristic of a wheel, said method comprising the steps of:

(a) generating a point beam of light such that said point beam of light comprises a signature light signal;

(b) projecting the point beam of light at a surface location on the wheel, said point beam of light impinging said surface location from a substantially orthogonal direction;

(c) sensing a reflection of said point beam of light from said wheel and producing therefrom an electrical analog signal representing said characteristic of said wheel, said sensing including filtering light signals other than said signature light signal comprising said point beam of light;

(d) digitizing said electrical analog signal to directly produce a digital output signal representing said characteristic of said wheel; and (e) automatically repositioning said point beam of light projected at the wheel and repeating said steps (c) & (d) for at least one other surface location on the wheel.

5. The method of claim 1, further comprising the steps of generating said point beam of energy and automatically controlling said generating of said point beam of energy such that reflection of said point beam of energy from said wheel is sufficient for said sensing step (b) to produce therefrom the electrical analog signal representing said characteristic of the wheel.

6. The method of claim 5, wherein said wheel is moving and wherein said method further comprises the step of automatically initiating said generating of said point beam of energy based on location of said wheel.

7. The method of claim 6, further comprising the step of synchronizing commencement of said sensing step (b) with said generating of said point beam of energy.

8. The method of claim 1, wherein said projecting step (a) includes projecting said point beam of energy along a projection axis and said sensing step (b) includes sensing the reflection of the point beam of energy along a reflection axis wherein said projection axis and said reflection axis form an acute angle of less than 45°.

9. The method of claim 8, wherein said projection axis and said reflection axis form an acute angle of approximately 15°.

10. The method of claim 1, wherein said wheel is moving and said method further comprises automatically correcting for distortion of said reflection of said point beam of energy due to moving of said wheel.

11. The method of claim 1, wherein said wheel comprises a railroad wheel and wherein said characteristic of the railroad wheel comprises one of flange height, flange thickness, flange throat, rim thickness, reference groove, diameter and "Gage" of said railroad wheel.

12. The method of claim 1, wherein said method further comprises performing said steps (b)–(d) from within a temperature controlled housing.

13. A method for simultaneously measuring in a contactless manner multiple characteristics of a wheel, said method comprising the steps of:

simultaneously, for each characteristic of said multiple characteristics:
  (a) projecting a point beam of energy at a surface location on the wheel, said point beam of energy impinging said surface location from a substantially orthogonal direction;
  (b) sensing a reflection of the point beam of energy and producing therefrom an electrical analog signal representing said characteristic of said wheel, said sensing including synchronizing commencing of said sensing with projecting of the point beam of energy in said step (a); and
  (c) digitizing said electrical analog signal to directly produce a digital output signal representing said characteristic of said wheel.

14. The method of claim 13, wherein for each characteristic of said multiple characteristics, said method further comprises the step of:
  (d) automatically repositioning said point beam of energy projected at the wheel and repeating said steps (b) & (c) for at least one other surface location on the wheel.

15. The method of claim 14, wherein for each characteristic of said multiple characteristics, said method further comprises the step of:
  (e) collecting said digital output signals to define said characteristic as a profile subset of said wheel.

16. A method for simultaneously measuring in a contactless manner multiple characteristics of a wheel, said method comprising the steps of:

simultaneously, for each characteristic of said multiple characteristics:
  (a) projecting a point beam of energy at a surface location on the wheel, said point beam of energy impinging said surface location from a substantially orthogonal direction;
  (b) sensing a reflection of the point beam of energy and producing therefrom an electrical analog signal representing said characteristic of said wheel; and
  (c) digitizing said electrical analog signal to directly produce a digital output signal representing said characteristics of said wheel; and
  wherein for each characteristic of said multiple characteristics, said point beam of energy comprises a point beam of light having a unique signature.

17. A method for simultaneously measuring in a contactless manner multiple characteristics of a wheel, said method comprising the steps of:

simultaneously, for each characteristic of said multiple characteristics:
  (a) projecting a point beam of energy at a surface location on the wheel, said point beam of energy impinging said surface location from a substantially orthogonal direction;
  (b) sensing a reflection of the point beam of energy and producing therefrom an electrical analog signal representing said characteristic of said wheel;
  (c) digitizing said electrical analog signal to directly produce a digital output signal representing said characteristic of said wheel; and
  wherein said wheel is moving, and wherein said digitizing step (c) includes automatically correcting for signal distortion resulting from moving of said wheel.

18. A method for simultaneously measuring in a contactless manner multiple characteristics of a wheel, said method comprising the steps of:

simultaneously, for each characteristic of said multiple characteristics:
  (a) projecting a point beam of energy at a surface location on the wheel, said point beam of energy impinging said surface location from a substantially orthogonal direction;
  (b) sensing a reflection of the point beam of energy and producing therefrom an electrical analog signal representing said characteristic of said wheel;
  (c) digitizing said electrical analog signal to directly produce a digital output signal representing said characteristic of said wheel; and
  wherein each point beam of energy follows a predefined, unique projection axis and the reflection thereof from the wheel is along a corresponding reflection axis, each unique projection axis and corresponding reflection axis pairing defining an acute angle of less than 45°.

19. A method for simultaneously measuring in a contactless manner multiple characteristics of a wheel, said method comprising the steps of:

simultaneously, for each characteristic of said multiple characteristics:
  (a) projecting a point beam of energy at a surface location on the wheel, said point beam of energy impinging said surface location from a substantially orthogonal direction;
  (b) sensing a reflection of the point beam of energy and producing therefrom an electrical analog signal representing said characteristic of said wheel; and
  (c) digitizing said electrical analog signal to directly produce a digital output signal representing said characteristic of said wheel; and
  wherein said wheel comprises a railroad wheel and said multiple characteristics comprise at least flange height, flange thickness and rim thickness of said railroad wheel.

20. A method for measuring in a contactless manner a physical characteristic of a wheel, said method comprising the steps of:
  (a) projecting along a projection axis a discrete beam of energy onto a surface of the wheel such that a reflection of said discrete beam of energy from said surface occurs along a reflection axis, said projection axis and said reflection axis forming an acute angle of less than 45°;
  (b) sensing said reflection of said discrete beam of energy and producing an electrical analog signal therefrom representing said physical characteristic of said wheel; and
  (c) digitizing said electrical analog signal to directly produce a digital output signal representing said physical characteristic of said wheel.

21. The method of claim 20, wherein said projection axis and said reflection axis of said projecting step (a) form an acute angle in a range of approximately 15°–30°.

22. The method of claim 20, wherein said wheel is rotating in a direction of movement and said method further comprises the step of:
  (d) automatically correcting for distortion of said reflection of said discrete beam of energy due to rotation of said wheel in said direction of movement.

23. The method of claim 20, wherein said wheel comprises a railroad wheel, and wherein said physical characteristic of the railroad wheel comprises one of flange height, flange thickness, flange throat, rim thickness, reference groove, diameter and "Gage".

24. A method for evaluating in a contactless manner a road surface, said method comprising the steps of:
   (a) projecting a discrete beam of energy at said road surface, said discrete beam of energy impinging said road surface from a substantially orthogonal direction, said discrete beam of energy comprising a signature signal;
   (b) sensing a reflection of said discrete beam of energy from said road surface and producing therefrom an electrical analog signal representing a characteristic of said road surface;
   (c) digitizing said electrical analog signal to directly produce a digital output signal representing said characteristic of said road surface; and
   (d) at least once, automatically repositioning said discrete beam of energy projected at the road surface and repeating said steps (b) & (c).

25. The method of claim 24, wherein said steps (a)–(d) are performed from a platform having a direction of movement relative to said road surface, and wherein said method further comprises automatically repositioning said discrete beam of energy projected at the road surface in a direction transverse to the direction of movement of said platform.

26. A system for measuring in a contactless manner a characteristic of a wheel, said system comprising:
   means for generating and projecting a point beam of energy at a surface location on the wheel such that said point beam of energy impinges said surface location from a substantially orthogonal direction and impinges said surface location only at a discrete point;
   means for sensing a reflection of said point beam of energy from said wheel and producing therefrom an electrical analog signal representing said characteristic of said wheel;
   means for digitizing said electrical analog signal to directly produce a digital output signal representing said characteristic of said wheel; and
   a beam deflector and associated control means for automatically repositioning said point beam of energy projected at the wheel to at least one other surface location on the wheel, said at least one other surface location being disposed transverse a radial circumference of the wheel, wherein multiple digital output signals each representative of the characteristic of the wheel can be produced.

27. The system of claim 26, further comprising means for collecting said digital output signals to define said characteristic as a profile subset of said wheel.

28. The system of claim 26, wherein said wheel is rotating in a direction of movement and said beam deflector and associated control means includes means for automatically repositioning said point beam of energy projected at the wheel in a direction transverse to said direction of movement of said wheel.

29. A system for measuring in a contactless manner a characteristic of a wheel, said system comprising:
   means for generating and projecting a point beam of light at a surface location on the wheel such that said point beam of light impinges said surface location from a substantially orthogonal direction, said point beam of light comprising a signature light signal;
   means for sensing a reflection of said point beam of light from said wheel and producing therefrom an electrical analog signal representing said characteristic of said wheel, said means for sensing including means for filtering light signals other than said signature light signal;
   means for digitizing said electrical analog signal to directly produce a digital output signal representing said characteristic of said wheel; and
   a beam deflector and associated control means for automatically repositioning said point beam of light projected at the wheel to at least one other surface location on the wheel such that multiple digital output signals, each representative of the characteristic of the wheel, can be produced.

30. The system of claim 26, wherein said means for generating and projecting said point beam of energy includes means for controlling intensity of said point beam of energy projected at the wheel.

31. The system of claim 26, wherein said means for generating and projecting said point beam of energy includes means for projecting said point beam of energy along a projection axis and said means for sensing includes means for sensing the reflection of said point beam of energy along a reflection axis, wherein the projection axis in the reflection axis form an acute angle of less than 45°.

32. The system of claim 31, wherein said projection axis and said reflection axis form an acute angle in a range of approximately 15°–30°.

33. The system of claim 26, wherein said wheel is moving and said system further comprises means for automatically correcting for distortion of said reflection of said point beam of energy due to moving of said wheel.

34. The system of claim 33, wherein said means for correcting includes means for determining velocity of said moving wheel independent of a diameter of said wheel.

35. The system of claim 26, wherein said wheel comprises a railroad wheel and wherein said characteristic of the railroad wheel comprises one of flange height, flange thickness, flange throat, rim thickness, reference groove, diameter and "Gage".

36. A system for measuring in a contactless manner a characteristic of a wheel, said system comprising:
   means for generating and projecting a point beam of energy at a surface location on the wheel such that said point beam of energy impinges said surface location from a substantially orthogonal direction;
   means for sensing a reflection of said point beam of energy from said wheel and producing therefrom an electrical analog signal representing said characteristic of said wheel;
   means for digitizing said electrical analog signal to directly produce a digital output signal representing said characteristic of said wheel; and
   a beam deflector and associated control means for automatically repositioning said point beam of energy projected at the wheel to at least one other surface location on the wheel such that multiple digital output signals, each representative of the characteristic of the wheel, can be produced, wherein said beam deflector of said beam deflector and associated control means comprises an acousto-optic deflector.

37. A system for measuring in a contactless manner a characteristic of a wheel, said system comprising:
   means for generating and projecting a point beam of energy at a surface location on the wheel such that said point beam of energy impinges said surface location from a substantially orthogonal direction;

means for sensing a reflection of said point beam of energy from said wheel and producing therefrom an electrical analog signal representing said characteristic of said wheel, wherein said means for sensing comprises a multi-element photodetector array structured to filter ambient light;

means for digitizing said electrical analog signal to directly produce a digital output signal representing said characteristic of said wheel; and a beam deflector and associated control means for automatically repositioning said point beam of energy projected at the wheel to at least one other surface location on the wheel such that multiple digital output signals, each representative of the characteristic of the wheel, can be produced.

38. A system for measuring in a contactless manner a characteristic of a wheel, said system comprising:

means for generating and projecting a point beam of energy at a surface location on the wheel such that said point beam of energy impinges said surface location from a substantially orthogonal direction;

means for sensing a reflection of said point beam of energy from said wheel and producing therefrom an electrical analog signal representing said characteristic of said wheel, wherein said means for sensing comprises an optics and a shutter means disposed over said optics, said shutter means being computer controlled to automatically open for sensing of said reflection of said point beam of energy from said wheel;

means for digitizing said electrical analog signal to directly produce a digital output signal representing said characteristic of said wheel; and a beam deflector and associated control means for automatically repositioning said point beam of energy projected at the wheel to at least one other surface location on the wheel such that multiple digital output signals each representative of the characteristic of the wheel can be produced.

39. The system of claim 38, wherein said means for sensing further comprises an air purge mechanism associated with said shutters and said optics, said air purge mechanism facilitate maintenance of said optics clean from external debris.

40. The system of claim 26, further comprising means for synchronizing operation of said means for generating and projecting the point beam of energy and said means for sensing the reflection of said point beam of energy.

41. A system for measuring in a contactless manner a characteristic of a wheel, said system comprising:

a beam generator for generating and projecting a point beam of energy at a surface location on the wheel such that said point beam of energy impinges said surface location from a substantially orthogonal direction and such that said point beam of energy impinges said surface location only at a point;

a sensor disposed to sense a reflection of said point beam of energy from said wheel, said sensor producing therefrom an electrical analog signal representing said characteristic of said wheel;

an analog-to-digital converter for digitizing said electrical analog signal to directly produce a digital output signal representing said characteristic of said wheel; and a beam deflector and associated controller for automatically repositioning said point beam of energy projected at the wheel to at least one other surface location on the wheel, said at least one other surface location being disposed transverse a radial circumference of the wheel, wherein multiple digital output signals, each representative of the characteristic of the wheel, can be produced.

42. A system for simultaneously measuring in a contactless manner multiple characteristics of a wheel, said system comprising:

multiple beam generators for generating and simultaneously projecting multiple point beams of energy at multiple surface locations on the wheel, each point beam of energy impinging said wheel from a substantially orthogonal direction and each comprising a unique signature signal;

multiple sensors for sensing reflections of said multiple point beams of energy from said wheel, each sensor of said multiple sensors sensing a respective reflection of one of said multiple point beams of energy, said respective reflection being indicative of a corresponding characteristic of said wheel, and producing therefrom an electrical analog signal representing said corresponding characteristic of said wheel; and means for digitizing said electrical analog signals to directly produce digital output signals representing said multiple characteristics of said wheel.

43. The system of claim 42, further comprising means for automatically repositioning each point beam of energy projected at the wheel such that multiple digital output signals for each characteristic of said multiple characteristics can be produced.

44. The system of claim 42, wherein each beam generator of said multiple beam generators generates a point beam of energy comprising a unique signature signal and wherein each beam generator of said multiple beam generators has associated therewith one sensor of said multiple sensors, said one associated sensor including a filter configured to receive said point beam of light comprising said unique signature signal.

45. The system of claim 44, wherein each point beam of energy of said multiple point beams of energy follows a predefined, unique projection axis and the reflection thereof from the wheel is along a corresponding reflection axis, each unique projection axis and corresponding reflection axis pairing defining an oblique angle of less than 45°.

46. The system of claim 44, wherein said wheel comprises a railroad wheel and said multiple characteristics comprise at least flange height, flange thickness and rim thickness of said railroad wheel.

47. A system for measuring in a contactless manner a physical characteristic of a wheel, said system comprising:

means for projecting, along a projection axis, a discrete beam of energy onto a surface of the wheel such that a reflection of said discrete beam of energy from said surface occurs along a reflection axis, said projection axis and said reflection axis forming an acute angle of less than 45°;

means for sensing said reflection of said discrete beam of energy and for producing an electrical analog signal therefrom representing said physical characteristic of said wheel; and means for digitizing said electrical analog signal to directly produce a digital output signal representing said physical characteristic of said wheel.

48. The system of claim 47, wherein said projection axis and said reflection axis form an acute angle in a range of approximately 15°–30°.

49. The system of claim 47, wherein said wheel comprises a railroad wheel, and wherein said physical characteristic of the railroad wheel comprises one of flange height, flange thickness, flange throat, rim thickness, reference groove, diameter and "Gage".

50. A system for evaluating in a contactless manner a road surface, said system comprising:

means for generating and projecting a discrete beam of energy at said road surface, said discrete beam of energy impinging said road surface from a substantially orthogonal direction, said discrete beam of energy comprising a signature signal;

a sensor for sensing a reflection of said discrete beam of energy from said road surface and producing therefrom an electrical analog signal representing a characteristic of said road surface;

means for digitizing said electrical analog signal to directly produce a digital output signal representing said characteristic of said road surface; and means for automatically repositioning said discrete beam of energy projected at the road surface at least once such that multiple digital output signals representing said characteristic of said road surface can be produced.

* * * * *

UNITED STATES PATENT AND TRADEMARK OFFICE
CERTIFICATE OF CORRECTION

PATENT NO. : 5,636,026
DATED : Jun. 3, 1997
INVENTOR(S) : Mian et al.

It is certified that error appears in the above-identified patent and that said Letters Patent is hereby corrected as shown below:

Column 26, line 40
"The system of claim 44" should read --The system of claim 42--

Column 26, line 46
"The system of claim 44" should read --The system of claim 42--

Signed and Sealed this

Eighteenth Day of November 1997

Attest:

BRUCE LEHMAN

Attesting Officer          Commissioner of Patents and Trademarks